(12) United States Patent
Meng et al.

(10) Patent No.: US 11,686,955 B2
(45) Date of Patent: Jun. 27, 2023

(54) OPTOELECTRONIC COMPUTING PLATFORM

(71) Applicant: Lightelligence, Inc., Boston, MA (US)

(72) Inventors: Huaiyu Meng, Medford, MA (US); Cheng-Kuan Lu, Littleton, MA (US); Jonathan Terry, Cambridge, MA (US); Jingdong Deng, Acton, MA (US); Maurice Steinman, Marlborough, MA (US); Gilbert Hendry, Swampscott, MA (US); Yichen Shen, Cambridge, MA (US)

(73) Assignee: Lightelligence, Inc., Boston, MA (US)

( * ) Notice: Subject to any disclaimer, the term of this patent is extended or adjusted under 35 U.S.C. 154(b) by 0 days.

(21) Appl. No.: 17/367,963

(22) Filed: Jul. 6, 2021

(65) Prior Publication Data
US 2022/0004029 A1 Jan. 6, 2022

Related U.S. Application Data

(60) Provisional application No. 63/123,338, filed on Dec. 9, 2020, provisional application No. 63/061,995, filed on
(Continued)

(51) Int. Cl.
*G02F 1/01* (2006.01)
*G02F 1/025* (2006.01)

(52) U.S. Cl.
CPC ............ *G02F 1/0121* (2013.01); *G02F 1/025* (2013.01)

(58) Field of Classification Search
CPC ................................. G02F 1/0121; G02F 1/025
See application file for complete search history.

(56) References Cited

U.S. PATENT DOCUMENTS 6,970,362 B1 11/2005 Chakravorty
7,343,059 B2 3/2008 Beusoleil et al.
(Continued)

OTHER PUBLICATIONS

Blasa et al., "Symmetric Push-Sum Protocol for Decentralised Aggregation", *The Third International Conference on Advances in P2P Systems*, (2011).
(Continued)

*Primary Examiner* — Ellen E Kim
(74) *Attorney, Agent, or Firm* — Fish & Richardson P.C.

(57) ABSTRACT

An integrated circuit interposer includes a semiconductor substrate layer; a first metal contact layer including a first metal contact section that includes metal contacts arranged for electrically coupling to a first semiconductor die in a controlled collapsed chip connection, and a second metal contact section that includes metal contacts arranged for electrically coupling to a second semiconductor die in a controlled collapsed chip connection. A first patterned layer includes individually photomask patterned metal path sections. A second patterned layer includes individually photomask patterned waveguide sections, including a first waveguide that crosses at least one boundary between individually photomask patterned waveguide sections. A first modulator is coupled to the first waveguide for modulating an optical wave in the first waveguide based on an electrical signal received at a first metal contact in the first metal contact section, and a second modulator is coupled to the first waveguide for modulating the optical wave based on an electrical signal received at a second metal contact in the first metal contact section or the second metal contact section.

61 Claims, 29 Drawing Sheets

Related U.S. Application Data on Aug. 6, 2020, provisional application No. 63/048,439, filed on Jul. 6, 2020.

(56) References Cited

U.S. PATENT DOCUMENTS

| | | | |
|---|---|---|---|
| 7,483,597 | B2 | 1/2009 | Shastri et al. |
| 8,363,993 | B2 | 1/2013 | Yu et al. |
| 9,337,138 | B1 | 5/2016 | Abugharbieh et al. |
| 9,391,708 | B2 | 7/2016 | Fincato et al. |
| 9,537,199 | B2 | 1/2017 | Dang et al. |
| 9,971,089 | B2 | 5/2018 | Zhang et al. |
| 10,009,668 | B2 | 6/2018 | Liboiron-Ladouceur et al. |
| 10,090,286 | B2 | 10/2018 | Budd et al. |
| 10,393,959 | B1 | 8/2019 | Razdan et al. |
| 10,439,720 | B2 | 10/2019 | Jou et al. |
| 10,581,215 | B2 | 3/2020 | Popoovic et al. |
| 2006/0024067 | A1 | 2/2006 | Koontz |
| 2006/0045418 | A1 | 3/2006 | Cho et al. |
| 2012/0001166 | A1 | 1/2012 | Doany et al. |
| 2016/0365929 | A1* | 12/2016 | Nakamura ........... H04B 10/541 |
| 2017/0200672 | A1 | 7/2017 | Jayasena et al. |
| 2018/0143374 | A1 | 5/2018 | Coolbaugh et al. |
| 2019/0265411 | A1 | 8/2019 | Huang et al. |
| 2019/0285804 | A1 | 9/2019 | Ramachandran et al. |
| 2019/0310433 | A1 | 10/2019 | Yoo et al. |
| 2019/0331941 | A1* | 10/2019 | Coolbaugh ............. G02F 1/035 |
| 2019/0356033 | A1 | 11/2019 | Dogiamis et al. |
| 2019/0370652 | A1 | 12/2019 | Shen et al. |
| 2019/0391327 | A1* | 12/2019 | Watanuki ............. H01L 25/167 |
| 2021/0201126 | A1 | 7/2021 | Meng et al. |

OTHER PUBLICATIONS

Fotouhi et al., "Enabling Scalable Chiplet-based Uniform Memory Architectures with Silicon Photonics", Conference: The International Symposium, DOI:10.1145/3357526.3357564 (Sep. 2019).

Fuketa et al., "On-Chip Buck Converter with Spiral Ferrite Inductor and Reducing IR Drop in 3D Stacked Integration", *The 2014 International Power Electronics Conference*, pp. 2228-2231 (2014).

Grani et al., "Photonic Interconnects for Interposer-based 2.5D/3D Integrated Systems on a Chip", *MEMSYS '16: Proceedings of the Second International Symposium on Memory Systems*, pp. 377-386. (Oct. 2016).

Mirshafiei et al., "Glass interposer for short reach optical connectivity", *Optics Express*, vol. 24, No. 11, pp. 12375-12384 (May 30, 2016).

Raj et al., "Emerging high-performance and low-cost power packaging solutions with nanoscale capacitors and inductors", *Georgia Institute of Technology*, APEC 2017 Industry Session—Component, Reliability and Manufacturing Innovations for 3D Power Packaging (2017).

Seok et al., "Wafer-scale silicon photonic switches beyond die size limit", Optica, vol. 6, No. 4, pp. 490-494 (Apr. 2019).

Sirbu et al., "3D Silicon Photonics Interposer for Tb/s Optical Interconnects in Data Centers with double-side assembled active components and integrated optical and electrical Through Silicon Via on SOI", *2019 IEEE 69th Electronic Components and Technology Conference (ECTC)*, pp. 1052-1059 (2019).

Sun et al., "A 45 nm CMOS-SOI Monolithic Photonics Platform With Bit-Statistics-Based Resonant Microring Thermal Tuning", *IEEE Journal of Solid-State Circuits*, vol. 51, No. 4, pp. 893-907 (Apr. 2016).

Takamiya et al., "3D Stacked Buck Converter with SrTiO$_3$ (STO) Capacitors on Silicon Interposer", PwrSoC Event held in Japan (2012).

Takemura et al., "Si Interposers with 15-μm-thick Spiral Inductors and SrTiO$_3$ Thin Film Capacitors for Novel 3D Stacked Buck Converters", Transactions of the Japan Institute of Electronics Packaging, vol. 6, No. 1, pp. 78-86 (2013).

Thonnart, "On the Way to Photonic Interposers, Building Blocks for Usr-Optical Communication", *Optics Workshop*, (Mar. 31, 2017).

Yin et al., "Modular Routing Design for Chiplet-based Systems, *2018 ACM/IEEE 45th Annual International Symposium on Computer Architecture*", pp. 726-738 (2018).

Zhang et al., "Heterogeneous 2.5D integration on through silicon interposer", Applied Physics Reviews, vol. 2, pp. 021308-1-021308-58 (2015).

Zia et al., "Chip-to-chip interconnect integration technologies", *IEICE Electronics Express*, vol. 13, No. 6, pp. 1-16 (2016).

The International Search Report and Written Opinion of the International Searching Authority for International Application No. PCT/US2021/040514, dated Dec. 7, 2021.

Lee et al., "Fat Tree Encoder Design for Ultra-High Speed Flash A/D Converters," 2002 45th Midwest Symposium on Circuits and Systems, Aug. 2002, 4 pages.

International Preliminary Report on Patentability in International Appln. No. PCT/US2021/040514, dated Jan. 19, 2023, 22 pages.

Office Action in Chinese Appln. No. 202180002830.6, dated Jan. 19, 2023, 22 pages (with English translation).

\* cited by examiner

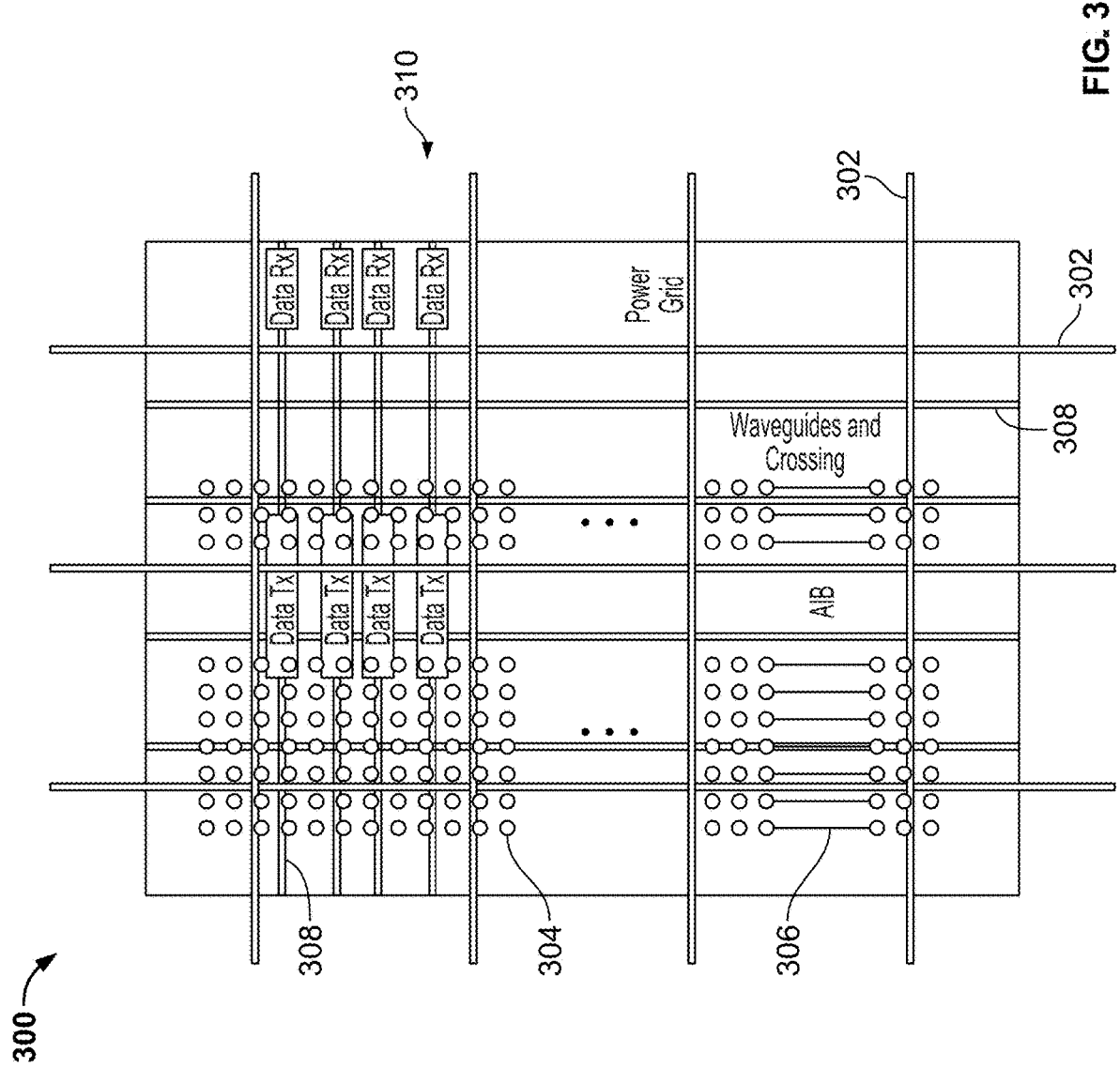

1300

1302 — Form on a semiconductor wafer a first metal contact layer, at a first surface of the integrated circuit interposer, including a plurality metal contact sections. The metal contact sections include a first metal contact section that includes a plurality of metal contacts arranged for electrically coupling to a first semiconductor die in a controlled collapsed chip connection, and a second metal contact section that includes a plurality of metal contacts arranged for electrically coupling to a second semiconductor die in a controlled collapsed chip connection.

1304 — Form on the semiconductor wafer a first patterned layer, at a first distance from the semiconductor substrate layer, including individually patterning a plurality of metal path sections.

1306 — Form on the semiconductor wafer a second patterned layer, at a second distance from the semiconductor substrate layer different from the first distance, including individually patterning a plurality of waveguide sections. The second patterned layer includes a first waveguide that crosses at least one boundary between individually photomask patterned waveguide sections, a first modulator coupled to the first waveguide at a first location along the first waveguide for modulating an optical wave in the first waveguide based on an electrical signal received at a first metal contact in the first metal contact section, and a second modulator coupled to the first waveguide at a second location along the first waveguide for modulating the optical wave in the first waveguide based on an electrical signal received at a second metal contact in the first metal contact section or the second metal contact section.

1402
Form a first metal contact layer on a semiconductor wafer, in which the first metal contact layer includes a plurality metal contact sections. The metal contact sections include a first metal contact section that includes a plurality of metal contacts configured to electrically couple to a first circuit, and a second metal contact section that includes a plurality of metal contacts configured to electrically couple to a second circuit.

1404
Form a first patterned layer on the semiconductor wafer, including individually patterning a plurality of metal path sections.

1406
Form a second patterned layer on the semiconductor wafer, including individually patterning a plurality of waveguide sections. The second patterned layer includes: a first waveguide that crosses at least one boundary between individually photomask patterned waveguide sections, a first modulator coupled to the first waveguide at a first location along the first waveguide configured to modulate an optical wave in the first waveguide based on an electrical signal received at a first metal contact in the first metal contact section, and a second modulator coupled to the first waveguide at a second location along the first waveguide configured to modulate the optical wave in the first waveguide based on an electrical signal received at a second metal contact in the first metal contact section or the second metal contact section.

FIG. 14

OPTOELECTRONIC COMPUTING PLATFORM

CROSS-REFERENCE TO RELATED APPLICATIONS

This application claims priority to U.S. Provisional Application 63/048,439, filed on Jul. 6, 2020, U.S. Provisional Application 63/061,995, filed on Aug. 6, 2020, and U.S. Provisional Application 63/123,338, filed on Dec. 9, 2020. The entire contents of the above applications are incorporated herein by reference.

TECHNICAL FIELD

This disclosure relates to an optoelectronic computing platform.

BACKGROUND

Computation performed on electronic data, encoded in analog or digital form on electrical signals (e.g., voltage or current), is typically implemented using electronic computing hardware, such as analog or digital electronics implemented in integrated circuits (e.g., a processor, application-specific integrated circuit (ASIC), or a system on a chip (SoC)), electronic circuit boards, or other electronic circuitry. Optical signals have been used for transporting data, over long distances, and over shorter distances (e.g., within data centers). Operations performed on such optical signals often take place in the context of optical data transport, such as within devices that are used for switching or filtering optical signals in a network. Use of optical signals in computing platforms has been more limited.

SUMMARY

In general, in a first aspect, an integrated circuit interposer includes: a semiconductor substrate layer; a first metal contact layer, at a first surface of the integrated circuit interposer, including a plurality metal contact sections, the metal contact sections including a first metal contact section that includes a plurality of metal contacts arranged for electrically coupling to a first semiconductor die in a controlled collapsed chip connection, and a second metal contact section that includes a plurality of metal contacts arranged for electrically coupling to a second semiconductor die in a controlled collapsed chip connection. The interposer includes a first patterned layer, at a first distance from the semiconductor substrate layer, including a plurality of individually photomask patterned metal path sections; and a second patterned layer, at a second distance from the semiconductor substrate layer different from the first distance, including a plurality of individually photomask patterned waveguide sections. The second patterned layer includes a first waveguide that crosses at least one boundary between individually photomask patterned waveguide sections, a first modulator coupled to the first waveguide at a first location along the first waveguide for modulating an optical wave in the first waveguide based on an electrical signal received at a first metal contact in the first metal contact section, and a second modulator coupled to the first waveguide at a second location along the first waveguide for modulating the optical wave in the first waveguide based on an electrical signal received at a second metal contact in the first metal contact section or the second metal contact section.

Aspects can include one or more of the following features. The waveguide sections can include a first waveguide section that includes a first portion of the first waveguide that couples a guided mode to an edge of the first waveguide section, and a second waveguide section that that includes a second portion of the first waveguide that couples a guided mode to an edge of the second waveguide section.

The metal path sections can include a first metal path section that overlaps with at least a portion of the first metal contact section and at least a portion of the second metal contact section, and provides at least one metal path between at least one metal contact of the first metal contact section and at least one metal contact of the second metal contact section.

The metal path sections can include a second metal path section that overlaps with at least a portion of the first metal contact section and does not overlap with any portion of the second metal contact section, and provides at least one metal path connected to at least one metal contact of the first metal contact section.

The integrated circuit interposer can further include a second metal contact layer, at a second surface of the integrated circuit interposer, including a plurality metal contact sections.

The integrated circuit interposer can further include at least one capacitor or inductor that is electrically coupled to at least one of the first semiconductor die or the second semiconductor die.

The first modulator and the second modulator can be amplitude modulators configured to modulate the optical wave in the first waveguide by the same predetermined amplitude scaling factor.

In general, in another aspect, a system includes an integrated circuit interposer and a plurality of semiconductor dies. The integrated circuit interposer includes a first substrate having a plurality of sets of metal contacts on a surface of the first substrate, the plurality of sets of metal contacts including a first set of metal contacts and a second set of metal contacts. The integrated circuit interposer further includes one or more patterned waveguide layers that form one or more optical waveguides. The plurality of semiconductor dies are electrically coupled to the plurality of sets of metal contacts on the first substrate, in which each semiconductor die includes a semiconductor substrate and circuitry formed on the semiconductor substrate. The plurality of semiconductor dies include a first semiconductor die and a second semiconductor die, the first semiconductor die includes first circuitry, the second semiconductor die includes second circuitry, the first semiconductor die is electrically coupled to the first set of metal contacts, and the second semiconductor die is electrically coupled to the second set of metal contacts. The first circuitry is configured to communicate optically with the second circuitry through the one or more optical waveguides.

Implementations can include one or more of the following features. The integrated circuit interposer can include a plurality of modulators and a plurality of photodetectors associated with the plurality of semiconductor dies, in which the plurality of modulators include a first modulator, and the plurality of photodetectors include a first photodetector. The first modulator of the integrated circuit interposer can be electrically coupled to one or more metal contacts in the first set of metal contacts and configured to receive a first transmit electric signal from the first circuitry of the first semiconductor die and modulate light traveling in a first optical waveguide of the integrated circuit interposer based on the first transmit electric signal. The first photodetector of the integrated circuit interposer can be electrically coupled to one or more metal contacts in the second set of metal contacts and configured to convert modulated light traveling in the first optical waveguide of the integrated circuit interposer to a first receive electric signal, and send the first receive electric signal to the second circuitry of the second semiconductor die through one or more of the metal contacts in the second set of metal contacts.

The plurality of modulators can include a second modulator, and the plurality of photodetectors can include a second photodetector. The second modulator of the integrated circuit interposer can be electrically coupled to one or more metal contacts in the second set of metal contacts and configured to receive a second transmit electric signal from the second circuitry of the second semiconductor die and modulate light traveling in the first optical waveguide or a second optical waveguide of the integrated circuit interposer based on the second transmit electric signal. The second photodetector of the integrated circuit interposer can be electrically coupled to one or more metal contacts in the first set of metal contacts and configured to convert modulated light traveling in the first or second optical waveguide of the integrated circuit interposer to a second receive electric signal, and send the second receive electric signal to the first circuitry of the first semiconductor die through one or more of the metal contacts in the first set of metal contacts.

The system can include a laser die disposed on or in the first substrate and configured to provide a laser beam directed to the one or more optical waveguides.

In general, in another aspect, an integrated circuit interposer includes: a semiconductor substrate, and a first metal contact layer that includes: a first metal contact section that includes metal contacts configured to electrically couple to a first circuit, and a second metal contact section that includes metal contacts configured to electrically couple to a second circuit. The integrated circuit interposer includes a first patterned layer including a plurality of individually photomask patterned metal path sections; and a second patterned layer including a plurality of individually photomask patterned waveguide sections. The second patterned layer includes: a first waveguide that crosses at least one boundary between individually photomask patterned waveguide sections, a first modulator coupled to the first waveguide at a first location along the first waveguide for modulating an optical wave in the first waveguide based on a first electrical signal sent from the first circuit and received at a first metal contact in the first metal contact section, and a second modulator coupled to the first waveguide at a second location along the first waveguide for modulating the optical wave in the first waveguide based on a second electrical signal sent from the second circuit and received at a second metal contact in the first metal contact section or the second metal contact section.

Implementations can include one or more of the following features. The first modulator and the second modulator can be amplitude modulators configured to modulate the optical wave in the first waveguide using distributed pulse-amplitude modulation.

The integrated circuit interposer can include at a destination of the modulated optical wave, digital logic for mapping an analog sum result to a digital sum result.

In general, in another aspect, a method of fabricating an integrated circuit interposer includes: forming on a semiconductor wafer a first metal contact layer, at a first surface of the integrated circuit interposer, including a plurality metal contact sections. The metal contact sections includes a first metal contact section that includes a plurality of metal contacts arranged for electrically coupling to a first semiconductor die in a controlled collapsed chip connection, and a second metal contact section that includes a plurality of metal contacts arranged for electrically coupling to a second semiconductor die in a controlled collapsed chip connection. The method includes forming on the semiconductor wafer a first patterned layer, at a first distance from the semiconductor substrate layer, including individually patterning a plurality of metal path sections; and forming on the semiconductor wafer a second patterned layer, at a second distance from the semiconductor substrate layer different from the first distance, including individually patterning a plurality of waveguide sections. The second patterned layer includes a first waveguide that crosses at least one boundary between individually photomask patterned waveguide sections, a first modulator coupled to the first waveguide at a first location along the first waveguide for modulating an optical wave in the first waveguide based on an electrical signal received at a first metal contact in the first metal contact section, and a second modulator coupled to the first waveguide at a second location along the first waveguide for modulating the optical wave in the first waveguide based on an electrical signal received at a second metal contact in the first metal contact section or the second metal contact section.

In general, in another aspect, a method of fabricating an integrated circuit interposer includes: forming a first metal contact layer on a semiconductor wafer, in which the first metal contact layer includes a plurality metal contact sections including: a first metal contact section that includes a plurality of metal contacts configured to electrically couple to a first circuit, and a second metal contact section that includes a plurality of metal contacts configured to electrically couple to a second circuit. The method includes forming a first patterned layer on the semiconductor wafer, including individually patterning a plurality of metal path sections; and forming a second patterned layer on the semiconductor wafer, including individually patterning a plurality of waveguide sections. The second patterned layer includes: a first waveguide that crosses at least one boundary between individually photomask patterned waveguide sections, a first modulator coupled to the first waveguide at a first location along the first waveguide configured to modulate an optical wave in the first waveguide based on an electrical signal received at a first metal contact in the first metal contact section, and a second modulator coupled to the first waveguide at a second location along the first waveguide configured to modulate the optical wave in the first waveguide based on an electrical signal received at a second metal contact in the first metal contact section or the second metal contact section.

In general, in another aspect, an apparatus includes an interconnection module. The interconnection module includes: a first substrate; a first metal contact layer formed on the first substrate, in which the first metal contact layer comprises a first metal contact configured to be electrically coupled to a first die comprising circuitry; and a patterned waveguide layer that comprises a plurality of individually photomask patterned waveguide sections disposed on the substrate, in which the patterned waveguide layer comprises a first waveguide that crosses at least one boundary between individually photomask patterned waveguide sections. The interconnection module includes a first modulator coupled to the first waveguide at a first location along the first waveguide and configured to modulate an optical signal traveling in the first waveguide based on a first electrical signal received at the first metal contact from the first die; and a second modulator coupled to the first waveguide at a second location along the first waveguide and configured to modulate the optical signal in the first waveguide based on a second electrical signal received at a second metal contact that is electrically coupled to the first die or a second die comprising circuitry. The first waveguide enables the optical signal to travel from a source location to a target location across the at least one boundary between individually photomask patterned waveguide sections and be modulated by the first and second modulators as the optical signal travels from the source location to the target location.

Aspects can include one or more of the following features. The first metal contact layer can include a second metal contact that is configured to be electrically coupled to a second die comprising circuitry.

The first metal contact can be electrically coupled to the first die in a controlled collapsed chip connection, and the second metal contact can be electrically coupled to the second die in a controlled collapsed chip connection.

The first metal contact can be located at a first region that corresponds to a first individually photomask patterned waveguide section; and the second metal contact can be located at a second region that corresponds to a second individually photomask patterned waveguide section different from the first individually photomask patterned waveguide section.

The apparatus can include: a detector configured to detect the optical signal after transmission past the first and second modulators to generate a detected signal; and circuitry configured to map a detected amplitude of the detected signal using a predetermined amplitude scale that indicates a number of modulators by which the signal was modulated.

The apparatus can include: a detector configured to detect the optical signal after transmission past the first and second modulators to generate a detected signal; and circuitry configured to map a detected phase of the detected signal using a predetermined phase scale that indicates a number of modulators by which the signal was modulated.

The apparatus can include: a detector configured to detect the optical signal after transmission past the first and second modulators to generate a detected signal; and circuitry configured to map a detected polarization of the detected signal using a predetermined polarization scale that indicates a number of modulators by which the signal was modulated.

Each individually photomask patterned waveguide section can be fabricated by exposure of a corresponding photomask using a lithography system, different individually photomask patterned waveguide sections can be fabricated by different exposures of a same photomask or different photomasks.

The first metal contact can be electrically coupled to the first die in a controlled collapsed chip connection.

The apparatus can include the first die.

The apparatus can include first and second dies.

In some examples, the first modulator can be configured to modulate an amplitude of the optical signal.

In some examples, the first modulator can be configured to modulate a phase or polarization of the optical signal.

The patterned waveguide layer can include: a first individually photomask patterned waveguide section that comprises a first portion of the first waveguide that couples a guided mode to an edge of the first waveguide section, and a second individually photomask patterned waveguide section that includes a second portion of the first waveguide that couples a guided mode to an edge of the second waveguide section.

The apparatus can include a second metal contact layer that includes a second metal contact, in which the first metal contact is disposed at a first side of the substrate, and the second metal contact is disposed at a second side of the substrate.

The interconnection module can include an optoelectronic interposer, in which the substrate, the first metal contact layer, the patterned waveguide layer, the first modulator, and the second modulator are parts of the optoelectronic interposer.

The first substrate can include a semiconductor substrate.

The interconnection module can include a filter capacitor or a decoupling capacitor that is electrically coupled to at least one of the first die or the second die.

In general, in another aspect, a method includes: at a first location along a first waveguide formed on a first substrate, modulating an optical signal in the first waveguide based on a first electrical signal received at a first metal contact electrically coupled to a first die comprising circuitry; at a second location along the first waveguide, modulating the optical signal in the first waveguide based on a second electrical signal received at a second metal contact electrically coupled to the first die or a second die comprising circuitry; and transmitting the modulated optical signal from a first individually photomask patterned waveguide section disposed on the first substrate to a second individually photomask patterned waveguide section disposed on the first substrate, in which the first individually photomask patterned waveguide section is fabricated by a first exposure of a first photomask using a lithography system, the second individually photomask patterned waveguide section is fabricated by a second exposure of a second photomask using the lithography system, the first exposure is different from the second exposure, and the first photomask is the same as or different from the second photomask.

Aspects can include one or more of the following features. The first metal contact can be located at a first region that corresponds to the first individually photomask patterned waveguide section, and the second metal contact can be located at a second region that corresponds to the second individually photomask patterned waveguide section.

The method can include detecting the modulated optical signal at a destination location downstream of intermediate locations where the optical signal are modulated to generate a detected signal; and mapping a detected amplitude of the detected signal using a predetermined amplitude scale that indicates a number of intermediate locations at which the signal was modulated.

The first individually photomask patterned waveguide section can be fabricated by a first exposure of a first photomask using a lithography system, the second individually photomask patterned waveguide section can be fabricated by a second exposure of a second photomask using the lithography system, the first exposure can be different from the second exposure, and the first photomask can be the same as or different from the second photomask The first metal contact can be electrically coupled to the first die in a controlled collapsed chip connection.

The first die can include a semiconductor die.

The first substrate can include a semiconductor substrate.

The second metal contact can be electrically coupled to the second die, and the method can include transmitting the modulated optical signal along the first waveguide across the at least one boundary between individually photomask patterned waveguide sections.

The first location and the second location along the first waveguide can be located on a same individually photomask patterned waveguide section.

The first location and the second location along the first waveguide can be located on different individually photomask pattered waveguide sections.

The method can include filtering, using a filter capacitor disposed on the first substrate, a signal on the first die or the second die, in which the first die or the second die comprises a second substrate different from the first substrate.

The method can include decoupling, using a decoupling capacitor disposed on the first substrate, a first circuitry portion from a second circuitry portion, in which the first circuitry portion is on the first or second die, and the second circuitry portion is on the first or second die.

In general, in another aspect, an apparatus includes an interposer. The interposer includes: an interposer substrate; and a first metal contact layer formed on the interposer substrate, in which the first metal contact layer comprises a first metal contact, a second metal contact, and a third metal contact, the first metal contact is configured to be electrically coupled to a first die comprising circuitry, the second metal contact is configured to be electrically coupled to the first die or a second die comprising circuitry, the first die comprising a first substrate different from the interposer substrate, the second die comprising a second substrate different from the interposer substrate. The interposer includes a patterned waveguide layer formed on the interposer substrate, in which the patterned waveguide layer comprises a first waveguide. The interposer includes a first modulator coupled to the first waveguide at a first location along the first waveguide and configured to modulate an optical signal traveling in the first waveguide based on a first electrical signal received at the first metal contact to generate a first modulated optical signal; and a second modulator coupled to the first waveguide at a second location along the first waveguide and configured to modulate the first modulated optical wave in the first waveguide based on a second electrical signal received at the second metal contact to generate a second modulated optical signal. The interposer includes a detector configured to detect the second modulated optical signal to generate a detected signal; and detection circuitry configured to map a detected characteristic of the detected signal to an output signal using a predetermined scale that indicates a number of modulators by which the signal was modulated in a predetermined manner, in which the output signal is electrically coupled to the third contact, and the third contact is electrically coupled to at least one of the first die, the second die, or the third die.

Aspects can include one or more of the following features. The first metal contact can be electrically coupled to the first die in a controlled collapsed chip connection.

The second metal contact can be electrically coupled to the second die in a controlled collapsed chip connection.

The third metal contact can be electrically coupled to the third die in a controlled collapsed chip connection.

The first metal contact layer can include a first metal contact section and a second metal contact section, the first metal contact section can include a plurality of metal contacts arranged for electrically coupling to the first die, and the second metal contact section can include a plurality of metal contacts arranged for electrically coupling to the second die.

The plurality of metal contacts in the first metal contact section can be electrically coupled to the first die in a controlled collapsed chip connection.

The plurality of metal contacts in the second metal contact section can be electrically coupled to the second die in a controlled collapsed chip connection.

The apparatus can include a first patterned metal layer formed on the interposer substrate, the first patterned metal layer can include a plurality of individually photomask patterned metal path sections.

The patterned waveguide layer can include a plurality of individually photomask patterned waveguide sections, and the first waveguide can cross at least one boundary between individually photomask patterned waveguide sections.

The first metal contact can be located at a first region that corresponds to a first individually photomask patterned waveguide section; and the second metal contact can be located at a second region that corresponds to a second individually photomask patterned waveguide section different from the first individually photomask patterned waveguide section.

In general, in another aspect, an apparatus includes: an interposer configured to perform a distributed pulse-amplitude modulation on an optical signal in a first optical waveguide based on a first electrical signal and a second electrical signal, in which the first electrical signal is received from a first die electrically coupled to the interposer, and the second electrical signal is received from the first die or a second die electrically coupled to the interposer.

Aspects can include one or more of the following features. The interposer can include an interposer substrate, the first die can include a first substrate different from the interposer substrate.

The second die can include a second substrate different from the interposer substrate.

The first die can be electrically coupled to the interposer using a controlled collapsed chip connection.

The second die can be electrically coupled to the interposer using a controlled collapsed chip connection.

The interposer can include: an interposer substrate; and a first metal contact layer formed on the interposer substrate, in which the first metal contact layer includes a first metal contact, a second metal contact, and a third metal contact, the first metal contact is configured to be electrically coupled to the first die, the second metal contact is configured to be electrically coupled to the first die or the second die.

The interposer can include the first optical waveguide, a first modulator, and a second modulator. The first modulator can be configured to modulate the optical signal in the first optical waveguide based on the first electrical signal received at the first metal contact. The second modulator can be configured to modulate the optical signal in the first optical waveguide based on the second electrical signal received at the second metal contact.

The apparatus can include a detector configured to detect the optical signal after transmission past the first and second modulators to generate a detected signal; and detection circuitry configured to map a detected amplitude of the detected signal to an output signal using a predetermined amplitude scale that indicates a number of modulators by which the signal was modulated.

The output signal can be electrically coupled to a third contact that is electrically coupled to at least one of the first die, the second die, or a third die.

In general, in another aspect, a method for transmitting information from a plurality of nodes to at least one destination is provided. The method includes: transmitting a signal having a predetermined preliminary amplitude from a source onto a transmission medium; and modulating an amplitude of the signal at each of a plurality of intermediate locations between the source and the destination by a selected modulation value from a binary set of two possible modulation values, where for each of the intermediate locations, in which the binary set consists of: the modulation value 1, and a predetermined amplitude scaling factor S that is greater than 0 and less than 1. The method includes detecting the signal at the destination after transmission past all of the intermediate locations; and mapping a detected amplitude of the detected signal using a predetermined amplitude scale that indicates a number of intermediate locations at which the signal was modulated by the predetermined amplitude scaling factor.

Aspects can include one or more of the following features. The predetermined amplitude scale can include a maximum detected amplitude that is substantially equal to the predetermined preliminary amplitude, and a minimum detected amplitude that is substantially equal to $S^N$ where N is the number of intermediate locations.

The predetermined amplitude scaling factor S can be different for each intermediate location.

The predetermined amplitude scaling factor S can be equal for each intermediate location.

The predetermined amplitude scaling factor S can be substantially equal to (k−1)/k, where k is the number of intermediate locations.

The signal transmitted from the source can have the predetermined preliminary amplitude within each of a plurality of time slots, including a first time slot.

The modulation of the amplitude of the signal at each of the plurality of intermediate locations can occur within the first time slot after a propagation delay based on a propagation distance between each intermediate location and the source.

The method can further include maintaining time synchronization among the plurality of nodes, the source, and the destination.

The transmission medium can include an optical waveguide.

The optical waveguide can be formed in an integrated circuit interposer that includes metal contacts arranged for electrically coupling to at least one semiconductor die in a controlled collapsed chip connection.

The selected modulation value at one or more of the intermediate locations can be provided based on an electrical signal from the semiconductor die.

In general, in another aspect, a system for transmitting information from a plurality of nodes to at least one destination is provided. The system includes: a transmission medium; a source configured to transmit a signal having a predetermined preliminary amplitude onto the transmission medium; and a plurality of amplitude modulators coupled to the transmission medium at respective intermediate locations between the source and the destination, each amplitude modulator configured to modulate an amplitude of the signal by a selected modulation value from a binary set of two possible modulation values. For each of the amplitude modulators, the binary set consists of: the modulation value 1, and a predetermined amplitude scaling factor S that is greater than 0 and less than 1. The system includes a detector at the destination configured to detect the signal after transmission past all of the intermediate locations; and circuitry configured to map a detected amplitude of the detected signal using a predetermined amplitude scale that indicates a number of intermediate locations at which the signal was modulated by the common amplitude scaling factor.

In general, in another aspect, a method includes: transmitting a signal having a predetermined preliminary optical characteristic from a source onto a transmission medium; modulating the optical characteristic of the signal at each of a plurality of intermediate locations between the source and a destination by a selected modulation value; detecting the signal at the destination after transmission past the intermediate locations; and mapping a detected optical characteristic of the detected signal using a predetermined scale that indicates a number of intermediate locations at which the signal was modulated.

Aspects can include one or more of the following features. The optical characteristic can include amplitude.

Modulating the optical characteristic can include modulating the amplitude of the signal at each of the plurality of intermediate locations by a modulation value selected from a binary set of two possible modulation values. For each of the intermediate locations, the binary set consists of: a modulation value 1, and a predetermined amplitude scaling factor S that is greater than 0 and less than 1.

Mapping a detected optical characteristic of the detected signal can include mapping a detected amplitude of the detected signal using a predetermined amplitude scale that indicates a number of intermediate locations at which the signal was modulated by the predetermined amplitude scaling factor.

The predetermined amplitude scale can include a maximum detected amplitude that is substantially equal to the predetermined preliminary amplitude, and a minimum detected amplitude that is substantially equal to $S^N$ in which N is the number of intermediate locations.

The predetermined amplitude scaling factor S can be different for each intermediate location.

The predetermined amplitude scaling factor S can be equal for each intermediate location.

The predetermined amplitude scaling factor S can be substantially equal to (k−1)/k, and k is the number of intermediate locations.

The signal transmitted from the source can have the predetermined preliminary amplitude within each of a plurality of time slots, including a first time slot.

The modulation of the amplitude of the signal at each of the plurality of intermediate locations can occur within the first time slot after a propagation delay based on a propagation distance between each intermediate location and the source.

The method can further include maintaining time synchronization among the plurality of nodes, the source, and the destination.

The transmission medium can include an optical waveguide.

The optical waveguide can be formed in an integrated circuit interposer that includes metal contacts arranged for electrically coupling to at least one semiconductor die in a controlled collapsed chip connection.

The selected modulation value at one or more of the intermediate locations can be provided based on an electrical signal from the semiconductor die.

Modulating the optical characteristic can include modulating the amplitude of the signal at each of the plurality of intermediate locations by a modulation value selected from a binary set of two possible modulation values. For each of the intermediate locations, the binary set can consist of: a modulation value 1, and a predetermined amplitude scaling factor S that is greater than 1.

The optical characteristic can include phase or polarization.

In general, in another aspect, a method includes: transmitting a signal having a predetermined preliminary first optical characteristic and a predetermined preliminary second optical characteristic from a source onto a transmission medium; modulating the first or second optical characteristic of the signal at each of a plurality of intermediate locations between the source and a destination by a selected modulation value; detecting the signal at the destination after transmission past the intermediate locations; and mapping detected first and second optical characteristics of the detected signal using a predetermined scale that indicates a number of intermediate locations at which the signal was modulated.

Aspects can include one or more of the following features. The first optical characteristic can include amplitude and the second optical characteristic can include phase.

The first optical characteristic can include amplitude and the second optical characteristic can include polarization.

The first optical characteristic can include phase and the second optical characteristic can include polarization.

The signal can have a predetermined preliminary third optical characteristic, the method can include modulating the first, second, or third optical characteristic of the signal at each of a plurality of intermediate locations between the source and a destination by a selected modulation value; and mapping detected first, second, and third optical characteristics of the detected signal using a predetermined scale that indicates a number of intermediate locations at which the signal was modulated.

The first optical characteristic can include amplitude, the second optical characteristic can include phase, and the third optical characteristic can include polarization.

In general, in another aspect, a system includes: a transmission medium; a source configured to transmit a signal having a predetermined preliminary optical characteristic onto the transmission medium; a plurality of optical characteristic modulators coupled to the transmission medium at respective intermediate locations between the source and the destination; a detector at the destination configured to detect the signal after transmission past the intermediate locations; and circuitry configured to map a detected optical characteristic of the detected signal using a predetermined scale that indicates a number of intermediate locations at which the signal was modulated.

Aspects can include one or more of the following features. Each optical characteristic modulator can include an amplitude modulator that is configured to modulate an amplitude of the signal by a selected modulation value from a binary set of two possible modulation values.

For each of the amplitude modulators, the binary set can consist of: the modulation value 1, and a predetermined amplitude scaling factor S that is greater than 0 and less than 1.

For each of the amplitude modulators, the binary set can consist of: the modulation value 1, and a predetermined amplitude scaling factor S that is greater than 1.

Each optical characteristic modulator can include a phase or polarization modulator that is configured to modulate a phase or polarization of the signal by a selected modulation value from a binary set of two possible modulation values.

Aspects can have one or more of the following advantages.

Data can be modulated onto any of a variety of types of signals. There are certain advantages that are associated with transmission or processing of certain types of signals compared to other types of signals. Examples of different types of signals include: an optical signal corresponding to an optical wave that has been modulated with signal data, and an electrical signal corresponding to an electrical waveform (e.g., voltage or current) that has been modulated with signal data. Various kinds of modulation can be used such as amplitude modulation, phase modulation, or a combination of amplitude and phase modulation according to a predetermined constellation. The optical wave that is used as the underlying signal carrier of an optical signal has certain advantages over an electrical waveform used as the underlying signal carrier of an electrical signal. For example, an optical wave typically has a higher bandwidth capacity than an electrical waveform. There is also typically a lower power demand, and a shorter time delay (or "latency") associated with transmitting data over a given distance for optical signals.

Optical signals can be used for communicating data between different electronic nodes in a system or device (e.g., computing nodes within a data center, or integrated circuits within a device package). But, there is typically overhead in complexity associated with use of such optical communication links, including conversion between optical signals and the electrical signals used as input and/or output of the electronic modules. There is also added latency associated with synchronization of the timing for signal conversion.

Some of the implementations of the optoelectronic computing platform described herein are able to reduce the complexity needed to incorporate communication over optical signals into the platform. By using a large (e.g., wafer-scale) optoelectronic interposer, a collection of integrated circuits can be combined in an efficient manner, as described in more detail below. A technique for distributed pulse-amplitude modulation (PAM) aggregation can also be used in such optoelectronic computing platforms, or other platforms or computing systems, to combine communication and computing in an efficient manner, as described in more detail below.

The details of one or more embodiments of the subject matter described in this specification are set forth in the accompanying drawings and the description below. Other features, aspects, and advantages of the invention will become apparent from the description, the drawings, and the claims.

Unless otherwise defined, all technical and scientific terms used herein have the same meaning as commonly understood by one of ordinary skill in the art to which this invention belongs. In case of conflict with patent applications or patent application publications incorporated herein by reference, the present specification, including definitions, will control.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 3 is a schematic diagram of an example of an optoelectronic interposer IC.

FIGS. 12 to 17 are flow diagrams.

Like reference numbers and designations in the various drawings indicate like elements.

DETAILED DESCRIPTION

Figure 1:
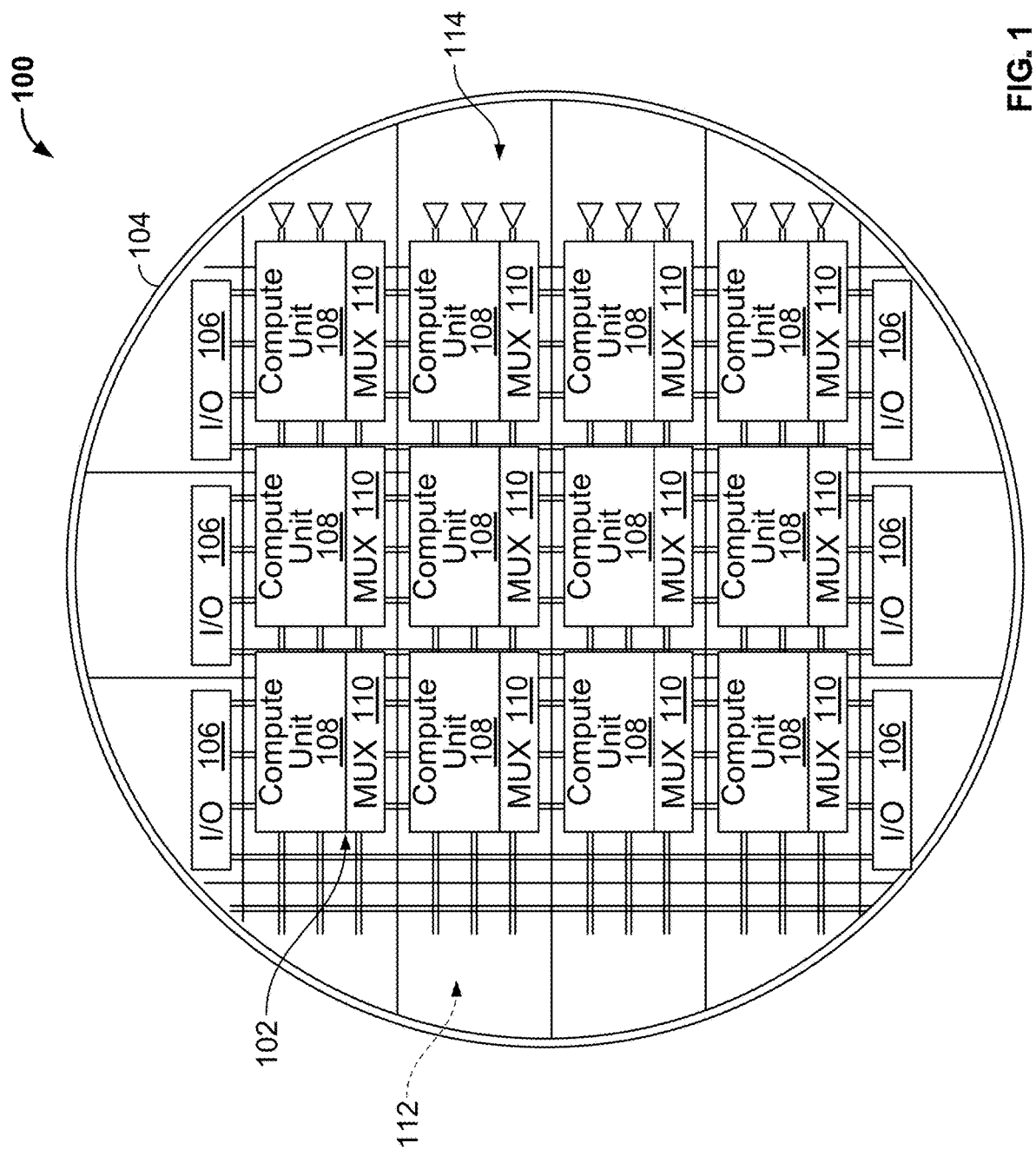
FIG. 1 is a schematic diagram of an example of an optoelectronic computing platform.

FIG. 1 shows an example of an optoelectronic computing platform 100. The platform 100 includes an array of computing nodes 102 that are each coupled to an optoelectronic interposer integrated circuit (OIIC) 104. In addition to the metal paths within one or more metal layers that provide electrical signal connections among computing nodes 102, as in typical electronic interposer ICs, the OIIC 104 in this example also includes optical waveguides that provide optical signal connections among computing nodes 102. Manufacturing challenges have been overcome to enable the OIIC 104 to be fabricated on a large substrate (e.g., an entire semiconductor wafer, such as a silicon-on-insulator (SOI) wafer) to support a relatively large number of computing nodes 102 and relatively long waveguides in at least one photonic layer of the OIIC 104. Each computing node 102 is implemented on a semiconductor die that is connected to the OIIC 104 in a controlled collapsed chip connection (or "flip chip" connection) using conducting bumps (e.g., solder bumps) on an arrangement of metal contacts on a surface of the OIIC 104. In proximity to opposite edges of the array of computing nodes 102, there are input/output (I/O) modules 106 also connected to the OIIC 104, which enable signals to be coupled into and out of the computing platform 100. The I/O modules 106 are able to couple the computing platform 100 to various devices, including e.g., dynamic random access memory (DRAM) chips, or other types of memory devices. To support the interface to such devices, the I/O module 106 can include circuitry configured according to any of a variety of device protocols, including DDR SDRAM, PCI(e), USB, Ethernet, etc. In this example, each computing node 102 of a 3×4 array of twelve computing nodes 102 includes a compute unit 108 (e.g., a CPU, or a GPU) and a multiplexer (MUX) 110, and each I/O module 106 includes I/O circuitry and a MUX (not shown). The MUXs 110 enable selection and routing of electrical signals as they are coupled to and from the OIIC 104. On another side of the OIIC 104 is a package substrate 112 that is able to provide electrical connections for signals and/or power, for example. Also shown in this example, in proximity to another edge of the array, is a row of interface ports 114 providing an alternative way to couple signals directly into or out of the OIIC 104. A variety of features of the OIIC 104 described herein enable power efficient integration of a variety of different functional chips on the wafer-scale optoelectronic computing platform 100.

Figure 2A:
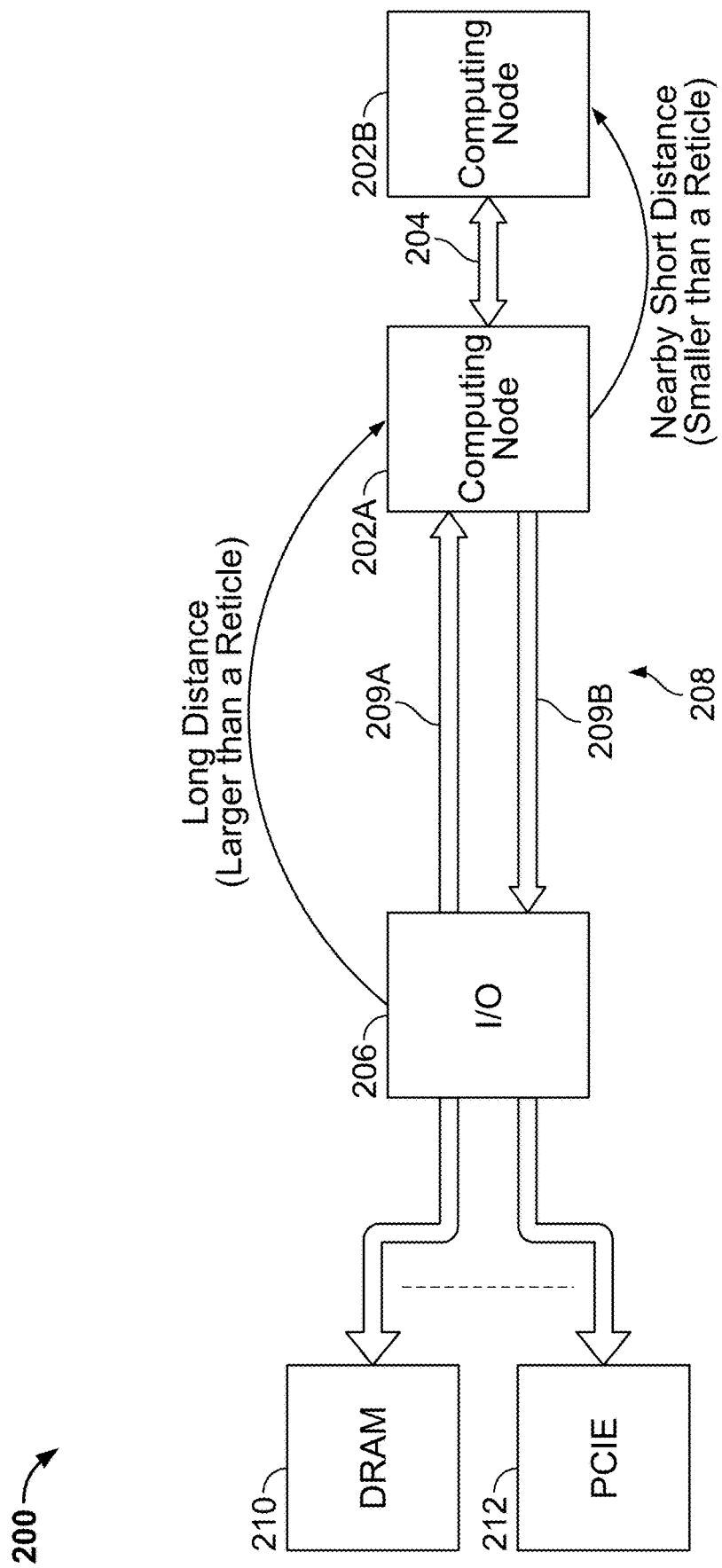
FIG. 2A is a schematic diagram of an example of data channels provided by an optoelectronic interposer IC.

FIG. 2A shows an example of a channel interface 200 providing data channels in an OIIC. For computing nodes 202A and 202B that are relatively close to each other, metal paths within the OIIC enable electrical signals to propagate over an electrical data channel 204 directly between the computing nodes 202A, 202B (or between the dies on which the computing nodes 202A, 202B are formed). For example, an advanced interface bus (MB) technology for connecting different chips (or "chiplets") in a multi-chip platform can be used to implement the electrical data channel 204 over the metal paths. In some implementations, the patterns of metal paths are defined by patterns of a corresponding photomask, in which the patterns on the photomask are transferred to a substrate of the optoelectronic interposer integrated circuit using a lithography system. The short distance between nearby computing nodes is defined by distances that are smaller than the length of the longest straight metal path that can be produced using a single photomask (or "reticle") used to pattern a single section of metal paths. For computing nodes that are relatively far from each other, or for computing nodes relatively far from an I/O module, optical waveguides within the OIIC enable optical signals converted from/to electrical signals of the nodes to propagate between the nodes. In FIG. 2A, the node 202A and an I/O module 206 far from the node 202A are connected by an optical data channel 208. In this example, the optical data channel 208 includes separate optical paths 209A and 209B (e.g., waveguides) carrying optical signals in opposite directions, but other examples can include optical paths that carry bidirectional optical signals.

In some implementations, the long distance is defined by distances that are larger than the longest dimension of an individually photomask patterned section. This long optical path provides a low-latency and power-efficient optical data channel that avoids the need for long wires in a large (e.g., wafer-scale) platform, which would bring both fabrication and performance challenges that may be difficult to overcome. The platform 100 selects an appropriate type of data channel (i.e., electrical or optical) depending on propagation distance between a source and a destination. Neighboring computing nodes can take advantage of the short electrical signal paths provided by the OIIC 104. At the same time, as shown in this example, a computing node (on a computing die) anywhere in the array can have a direct optical connection to an I/O module 206 (on an I/O die) and its connected device (e.g., a DRAM 210 or PCI(e) device 212), with similar large bandwidth and low latency as short electrical connections between neighboring computing nodes. This breaks the access limitation that could otherwise be encountered by center dies in large multi-chip platforms.

In some implementations, the conversion between electrical signals and optical signals for use of the optical channels takes place at bidirectional transceivers within the photonic layer of the OIIC 104. For example, for electricalto-optical conversion, a bidirectional transceiver can include an optical modulator (e.g., a Mach-Zehnder Interferometer) that receives an electronic signal (e.g., a voltage signal) for use to control the amplitude modulation of an optical wave provided by an optical source to generate a modulated optical wave. The optical source can be a laser that is integrated into the platform 100, or a port of an edge coupler or a surface grating coupler that receives an optical wave from an optical fiber coupled to an external laser, for example. For optical-to-electrical conversion, the bidirectional transceiver can include a photodetector that converts an optical power of an optical wave to a generated electrical current signal. That electrical current signal can then be converted to an electrical voltage signal within the computing node (e.g., using a transimpedance amplifier). The electrical signals are able to be transmitted to and from metal contacts at the surface of the OIIC 104 by through-silicon vias (TSVs), for example.

Figure 2B:
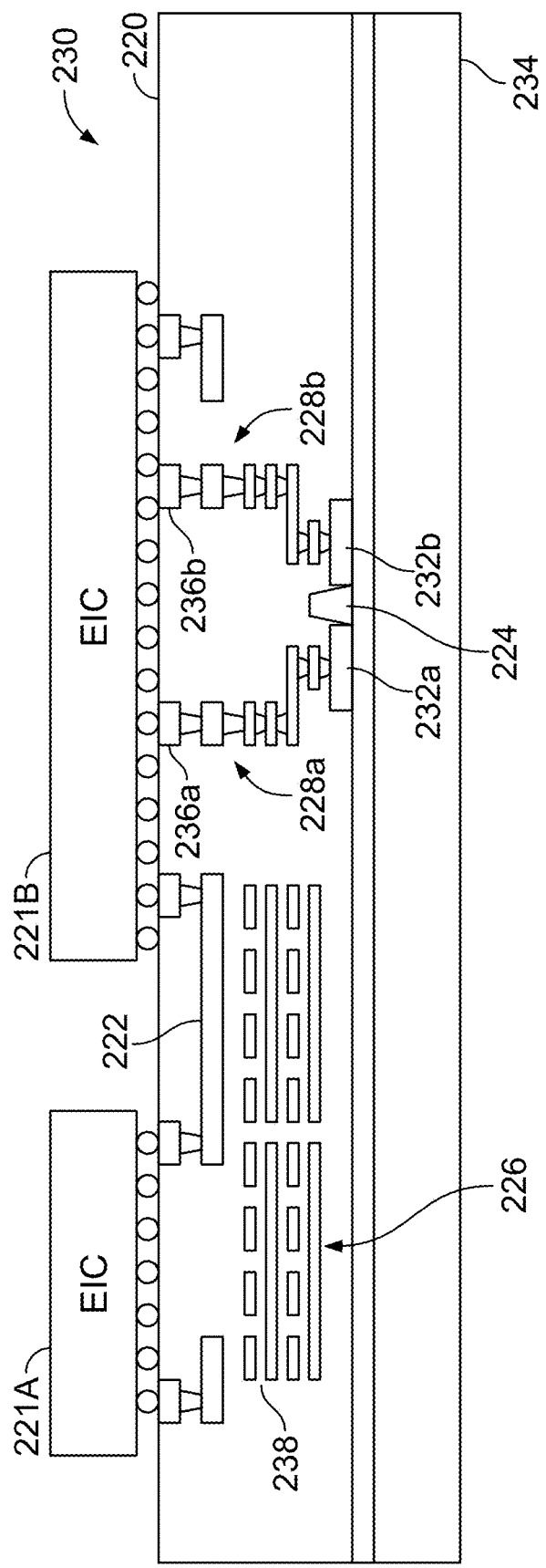
FIG. 2B is a schematic diagram of an example optoelectronic interposer IC including passive electronic components.

FIG. 2B shows an example of other kinds of components that can be included in an OIIC 230. The OIIC 230 includes metal layers and waveguide layers 220 formed on a substrate 234. In this example, along with metal interconnects 222 (e.g., some for carrying signals and some metal interconnects for carrying power), and optical waveguide interconnects 224, there is a region 226 including metal capacitors (e.g., 238) and planar inductors. The metal interconnects 222 are able to interconnect different electronic integrated circuits (EIC), such as electronic integrated circuit 221A and electronic integrated circuit 221B. For example, the electronic integrated circuit 221A can be similar to the compute unit 108 of FIG. 1, and the electronic integrated circuit 221B can be similar to the multiplexer 110. The electronic integrated circuit 221A performs computations and transmits data to other computing nodes through the electronic integrated circuit 221B and the optical waveguide interconnects 224. Passive electronic components such as capacitors and inductors, for example, can be useful for making better use of the limited area within each computing die coupled to the OIIC 230. For example, capacitors can be used for power decoupling in an electronic circuit, where it is useful for the power decoupling capacitors to be relatively close to the electronic circuit. Metal TSVs (not shown) can be used to charge and discharge these capacitors as needed from one of the metal contacts connected to the computing die. These passive components can use a relatively large amount of space, and there can be more space available in the OIIC 230 than in the computing die. Since the passive component(s) can be placed just under the computing die such as EIC 221A that includes a circuit using the passive component(s), there is a relatively short distance for the metal conducting paths used to make the electrical connection.

In the example of FIG. 2B, the EIC 221B modulates light traveling in the optical waveguide 224 by applying electrical signals through electrical paths 228a, 228b to electrodes 232a, 232b, respectively, to modulate the refractive index of a portion of the waveguide 224. This enables the EIC 221B to generate a modulated optical signal that can be transmitted to another EIC or an I/O module 206. Likewise, a photodetector can be coupled to a waveguide, and the electrical output of the photodetector can be electrically coupled to the EIC 221B through an electrical path that is similar to the electrical path 228a or 228b. The electrical paths 228a, 228b include metal contacts electrically coupled to the EIC 221B.

FIG. 3 shows an example of an arrangement 300 of paths within layers of an OIIC 310. Because the size of the arrangement 300 is larger than a typical pattern produced by a single reticle in a semiconductor fabrication process, the arrangement 300 can be fabricated using multiple individually photomask patterned sections formed using one or more photomasks. In some implementations, a wafer-scale OIIC 310 is formed over most of an entire semiconductor wafer. A grid of metal paths 302 provide a power distribution grid within a layer of the OIIC 310. The power distribution grid can be connected to one or more power sources at the edges of the arrangement 300 and/or by TSVs distributed over the arrangement 300, for example. At regular intervals, each group of metal contacts 304 provides a dense connection array for an individual computing die in a controlled collapsed chip connection. Short metal paths 306 between arrays of respective edge rows of contacts for different computing dies are used for electrical channels (e.g., advanced interface bus channels). While it may be more difficult to fabricate metal paths 306 for data that cross boundaries between multiple individually photomask patterned sections due to pattern misalignment, the metal paths 302 for power can be fabricated to cross those boundaries due to the much wider thickness of the metal paths 302. In some implementations, the metal paths 302 and the metal paths 306 can be fabricated in different metal layers, or in a single metal layer.

In at least one photonic layer separate from the metal layer(s), long waveguides 308 that cross boundaries between multiple individually photomask patterned sections are used for optical channels. Techniques can be used to reduce the loss that would otherwise be associated with any misalignment between neighboring photomask patterned sections, such as by tapering a waveguide width to be larger near the crossing (up to around 10 microns for a loss of only around 0.004 dB), as described for example in Seok, et al. "Wafer-scale silicon photonic switches beyond die size limit," incorporated herein by reference. Transmitter and receiver devices, or transceiver devices that include both a transmitter device and a receiver device, are placed at regular intervals to enable optical signals to be transmitted from and received at different computing dies. In some implementations, there are multiple photonic layers with waveguides along one direction in one layer and waveguides along the perpendicular direction in another layer. Alternatively, in some embodiments, there can be photonic devices, such as directional switches, at the intersection between two waveguides. The switches can be controlled by electronic signals provided by computing nodes or from a controller that is outside of the computing nodes.

There are a variety of advantages that can be provided by some implementations of an OIIC as described herein. One potential advantage is the large number of optical channels that can be supported due to the density of the optical waveguides that can be fabricated in the photonic layer(s) of the OIIC. The density achieved may be limited by a pitch achievable in fabricating sets of parallel waveguides, but can be on the order of hundreds or even thousands of waveguides. This yields a potentially much larger number of optical signal paths than could be provided with optical fiber arrays, which may be limited to a much smaller quantity (e.g., around 16 or 32). There are also advantages in the size of the OIIC. The computing nodes (e.g., 102), which can be more sensitive to fabrication yield, are kept small (the size of single photomask patterned die chiplet). The OIIC (e.g., 104), with a better fabrication yield, can be larger (e.g., most of a 30 cm×30 cm full wafer). Thus, the OIIC is large enough to accommodate a large number of chiplet computing nodes, but small enough to be much more compact than a platform that uses external photonic couplers, modulators, and switches. There can also be fewer sockets needed within the platform for photonic devices, leaving more available space for the chiplet computing nodes. The optoelectronic computing platform that uses the OIIC can also be very flexible by incorporating any of a variety of types of computing nodes as long as the die size and arrangement of contacts/bumps is the same. The applications of such a platform can be used for a variety of applications such as neuromorphic computing or high performance computing, or custom applications that can benefit from a dense and flexible optical network substrate to reduce power demands, manage thermal dissipation, increase signal bandwidth, and/ or reduce communication latency.

In addition to supporting communication between different computing nodes or between a computing node and an I/O module, the optical channels provided by the OIIC can also be used for efficient forms of distributed computing that can be performed using elements within the OIIC. As an example of such distributed computing is a distributed pulse-amplitude modulation (PAM) aggregation technique that can be used with an optical signal transmitted over an optical transmission medium, such as an optical waveguide in the OIIC, or with a variety of other types of signals transmitted over other appropriate transmission media. As an example of the distributed PAM aggregation technique, a system will be considered that includes multiple nodes generating partial results (e.g., different summands, or different partial sums) that need to be added together to produce an aggregated total sum at a particular destination in the system.

Figure 4A:
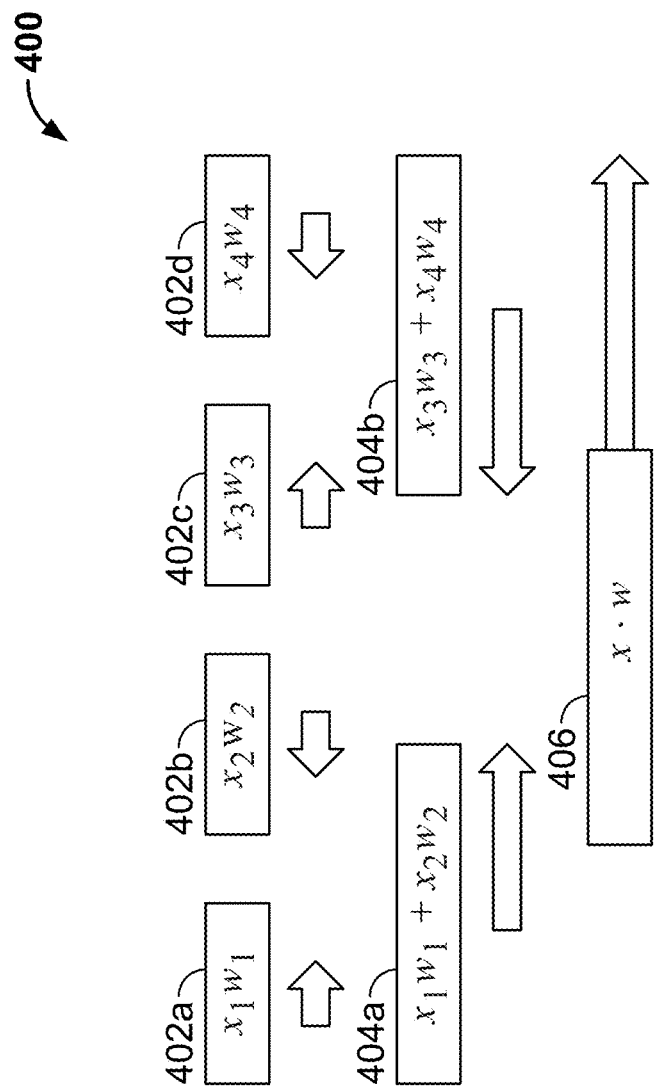
FIGS. 4A and 4B are schematic diagrams of examples of movement of partial results in a distributed summation computation.

FIG. 4A shows an example movement of partial results 400 in a distributed summation computation. Each box represents a different computing node in a system, and the arrows represent directions of movements of the partial results in the system. The example computation being performed is the following dot product of two vectors, which can be part of a larger computation, such as the multiplication of a vector and a matrix or the multiplication of two matrices.

$$x \cdot w = x_1 w_1 + x_2 w_2 + x_3 w_3 + x_4 w_4$$

For example, the vector x can be an input vector, and the vector w can be a row of elements of a matrix of weight values. Each of an initial set of computing nodes 402a, 402b, 402c, 402d (collectively referenced as 402), represented in the top row, computes a different product of individual elements of the vectors in the dot product. The partial results from these computations then move to other computing nodes 404a, 404b (collectively referenced as 404), represented in the middle row, which each compute a sum of those partial results. The partial results from these computations then move to another computing node 406, which computes a final sum to yield the total result that may then need to move to a different part of the system. This is just one example arrangement in which accumulation paths sink results into the center in a physical realization. Generally, a non-systolic architecture may call for a bus that has a length that does not scale efficiently.

Figure 4B:
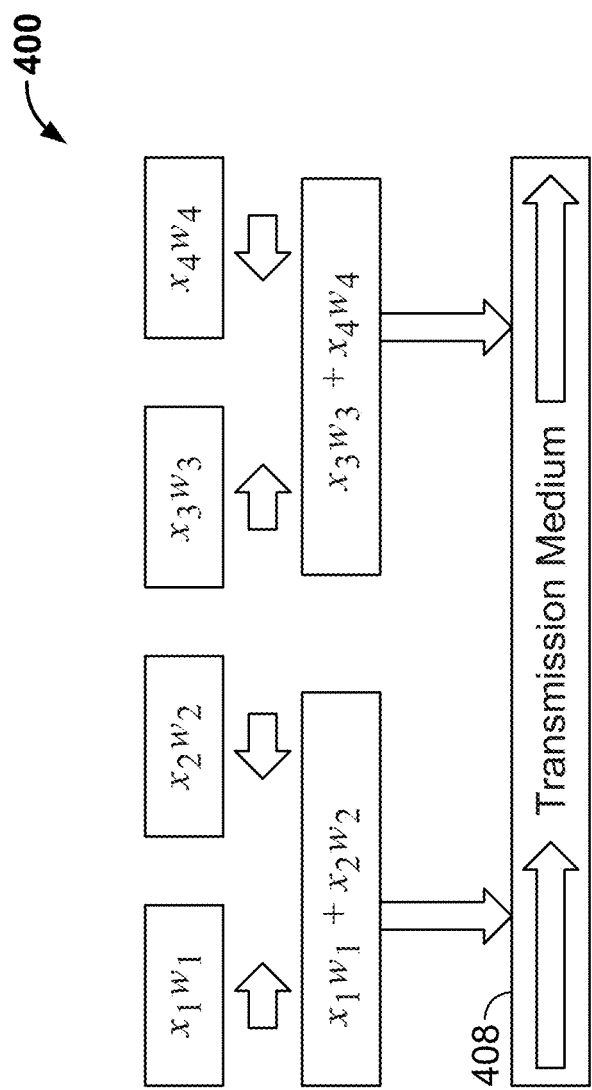

FIG. 4B shows an alternative example of movement of partial results 400 in which the summation at the final result stage is performed using a transmission medium 408 (e.g., an optical waveguide). As a signal propagates down the waveguide, the amplitudes of different pulses within the signal are modulated such that a final result is represented in the final amplitudes. This example exploits the sinking symmetry of the computation, and provides results quickly (e.g., near the speed of light) by performing the addition using multiple binary modulation operations to generate a multi-level PAM modulated result, with the distributed PAM aggregation technique described in more detail below.

Figure 5A:
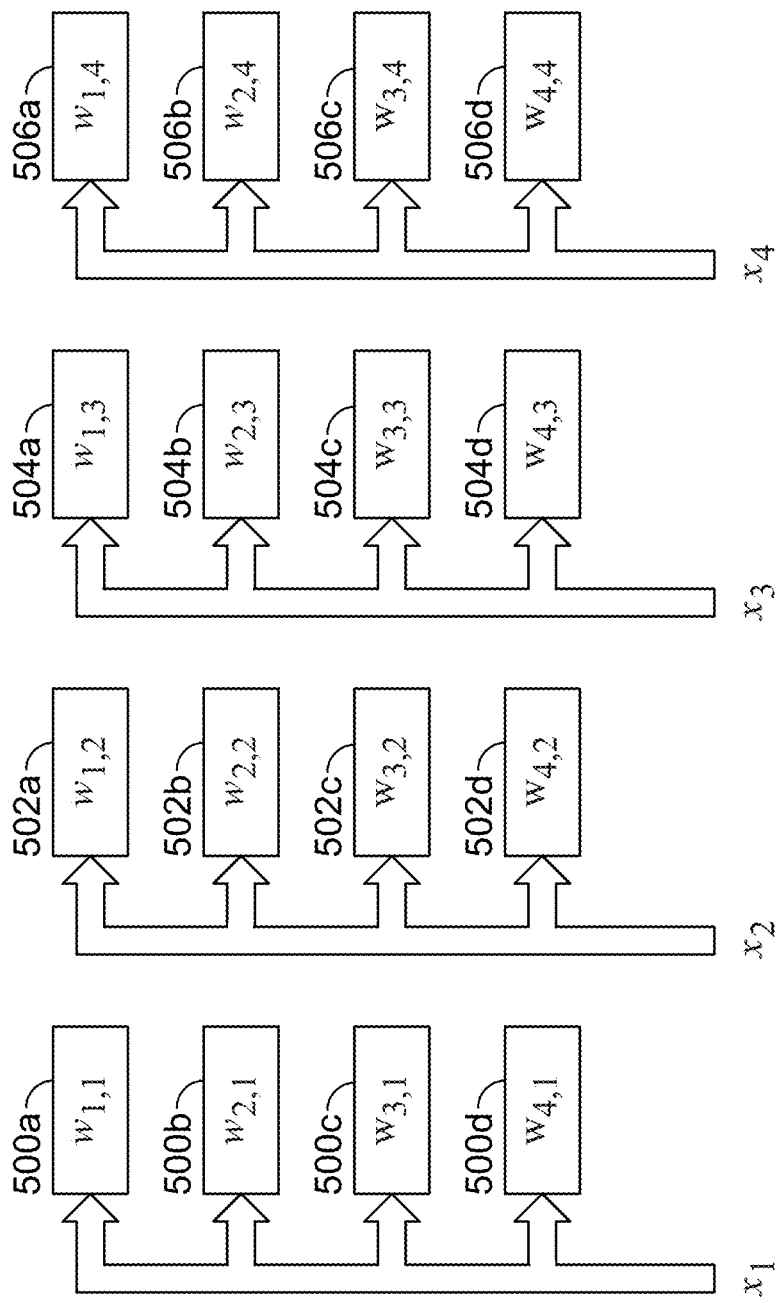
FIGS. 5A, 5B, and 5C are schematic diagrams of examples of data flow in a distributed computation architecture.
Figure 5B:
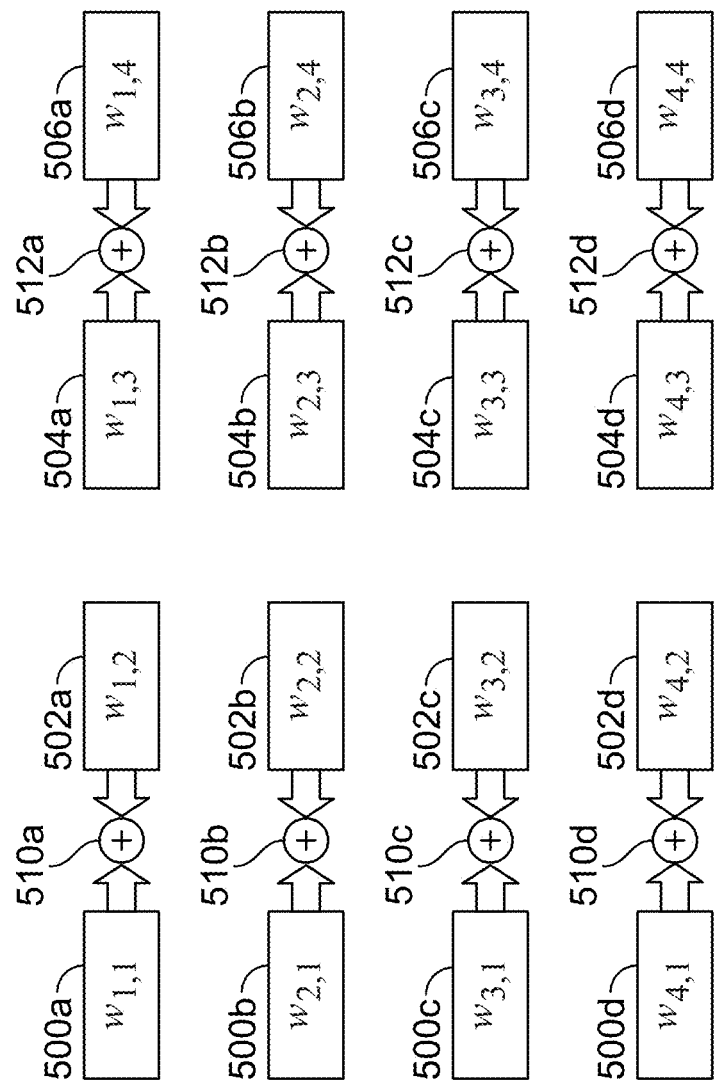
Figure 5C:
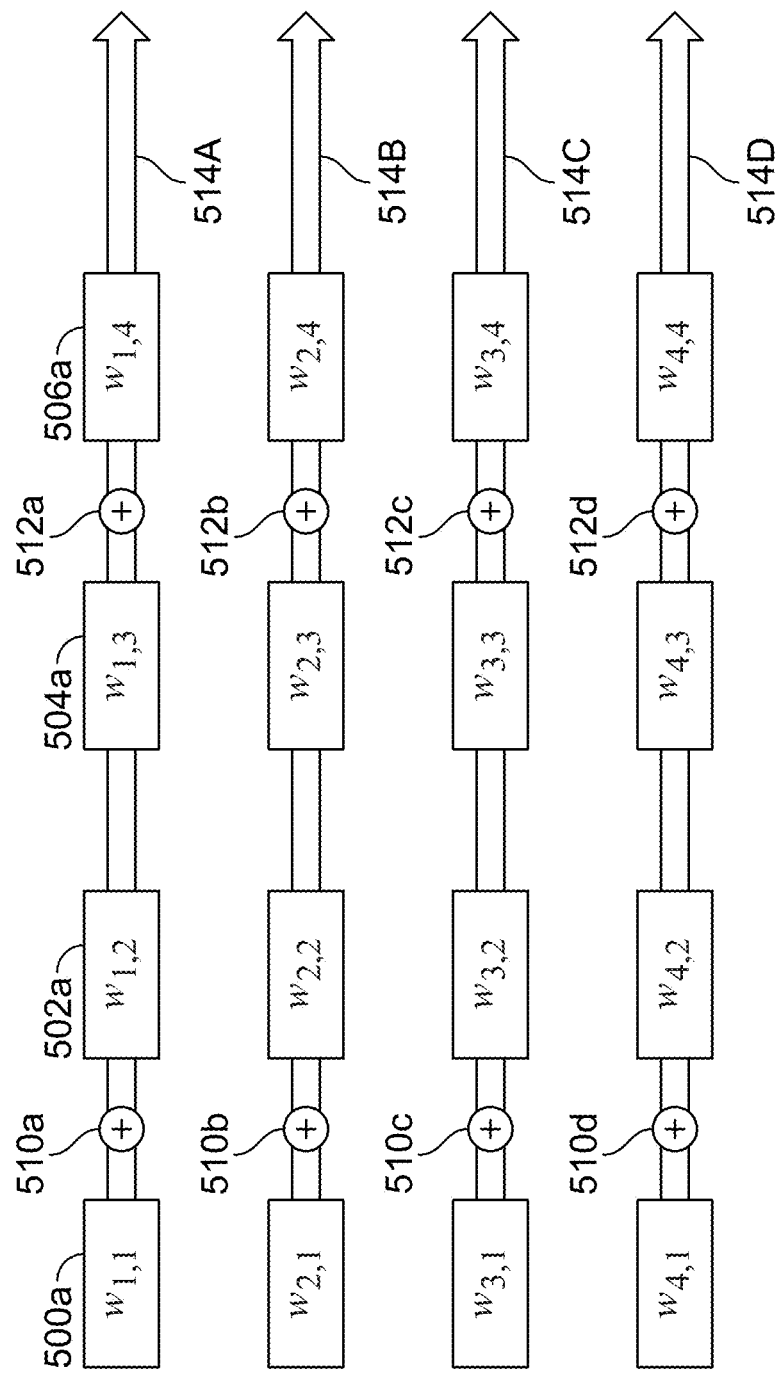

FIGS. 5A, 5B, and 5C show different stages of an example of data flow in a distributed vector matrix multiplication (VMM) system having a plurality of multiplication modules, labeled according to the weight value $w_{m,n}$ of a matrix used in a VMM computation, where m corresponds to a row of the matrix and n corresponds to a column of the matrix. The distributed vector matrix multiplication (VMM) system is configured to perform the following matrix operation:

$$\begin{bmatrix} w_{1,1} & w_{1,2} & w_{1,3} & w_{1,4} \\ w_{2,1} & w_{2,2} & w_{2,3} & w_{2,4} \\ w_{3,1} & w_{3,2} & w_{3,3} & w_{3,4} \\ w_{4,1} & w_{4,2} & w_{4,3} & w_{4,4} \end{bmatrix} \cdot \begin{bmatrix} x_1 \\ x_2 \\ x_3 \\ x_4 \end{bmatrix}$$

In FIG. 5A, the four elements of the vector x are distributed for multiplication by different weight values of the matrix. For example, a computing node 500a performs the multiplication $w_{1,1} \cdot x_1$, a computing node 500b performs the multiplication $w_{2,1} \cdot x_1$, a computing node 500c performs the multiplication $w_{3,1} \cdot x_1$, and a computing node 500d performs the multiplication $w_{4,1} \cdot x_1$. A computing node 502a performs the multiplication $w_{1,2} \cdot x_2$, a computing node 502b performs the multiplication $w_{2,2} \cdot x_2$, a computing node 502c performs the multiplication $w_{3,2} \cdot x_2$, and a computing node 502d performs the multiplication $w_{4,2} \cdot x_2$. A computing node 504a performs the multiplication $w_{1,3} \cdot x_3$, a computing node 504b performs the multiplication $w_{2,3} \cdot x_3$, a computing node 504c performs the multiplication $w_{3,3} \cdot x_3$, and a computing node 504d performs the multiplication $w_{4,3} \cdot x_3$. A computing node 506a performs the multiplication $w_{1,4} \cdot x_4$, a computing node 506b performs the multiplication $w_{2,4} \cdot x_4$, a computing node 506c performs the multiplication $w_{3,4} \cdot x_4$, and a computing node 504d performs the multiplication $w_{4,4} \cdot x_4$.

In FIG. 5B, after multiplication of vector element values with respective weight values, adder trees work inward toward centers of the multiplication modules to generate a number of distinct partial sum results. Adders 510a, 510b, 510c, 510d (collectively referenced as 510) and adders 512a, 512b, 512c, 512d (collectively referenced as 512) are provided to generate partial sum results. For example, an adder 510a adds the outputs of computing nodes 500a and 502a to produce the sum $w_{1,1} \cdot x_1 + w_{1,2} \cdot x_2$, an adder 510b adds the outputs of computing nodes 500b and 502b to produce the sum $w_{2,1} \cdot x_1 + w_{2,2} \cdot x_2$ An adder 510c adds the outputs of computing nodes 500c and 502c to produce the sum $w_{3,1} \cdot x_1 + w_{3,2} \cdot x_2$, and an adder 510d adds the outputs of computing nodes 500d and 502d to produce the sum $w_{4,1} \cdot x_1 + w_{4,2} \cdot x_2$. An adder 512a adds the outputs of computing nodes 504a and 506a to produce the sum $w_{1,3} \cdot x_3 + w_{1,4} \cdot x_4$, an adder 512b adds the outputs of computing nodes 504b and 506b to produce the sum $w_{2,3} \cdot x_3 + w_{2,4} \cdot x_4$. An adder 512c adds the outputs of computing nodes 504c and 506c to produce the sum $w_{3,3} \cdot x_3 + w_{3,4} \cdot x_4$, and an adder 512d adds the outputs of computing nodes 504d and 506d to produce the sum $w_{4,3} \cdot x_3 + w_{4,4} \cdot x_4$. In this example, the adders 510 and 512 perform the addition operations in the electrical domain. The adders 510 are electrically coupled to the computing nodes 500 and 502. The adders 512 are electrically coupled to the computing nodes 504 and 506.

In FIG. 5C, for each element of an output vector, the partial sums within each row are added together to accumulate total sums by distributed PAM aggregation over a corresponding transmission medium 514A, 514B, 514C, and 514D (e.g., a corresponding optical waveguide) for each row. FIG. 5C shows a top view of an example of the computing nodes (e.g., 500, 502, 504, 506) and adders (e.g., 510, 512) overlaid on top of the transmission medium 514A, 514B, 514C, 514D. In this example, the adders 510a and 512a modulate the light traveling in the transmission medium 514A according to, e.g., the distributed PAM aggregation technique described in more detail below. Similarly, the adders 510b and 512b modulate the light traveling in the transmission medium 514B, the adders 510c and 512c modulate the light traveling in the transmission medium 514C, and the adders 510d and 512d modulate the light traveling in the transmission medium 514D, all according to, e.g., the distributed PAM aggregation technique. In this example, the computing nodes 500, 502, 504, and 506 are not optically coupled to the transmission medium 514A, 514B, 514C, and 514D. By synchronously driving the optical channels (e.g., within an OIIC), the results can be simultaneously accumulated and transmitted to the appropriate destination computing node within an optoelectronic computing platform.

Figure 6:
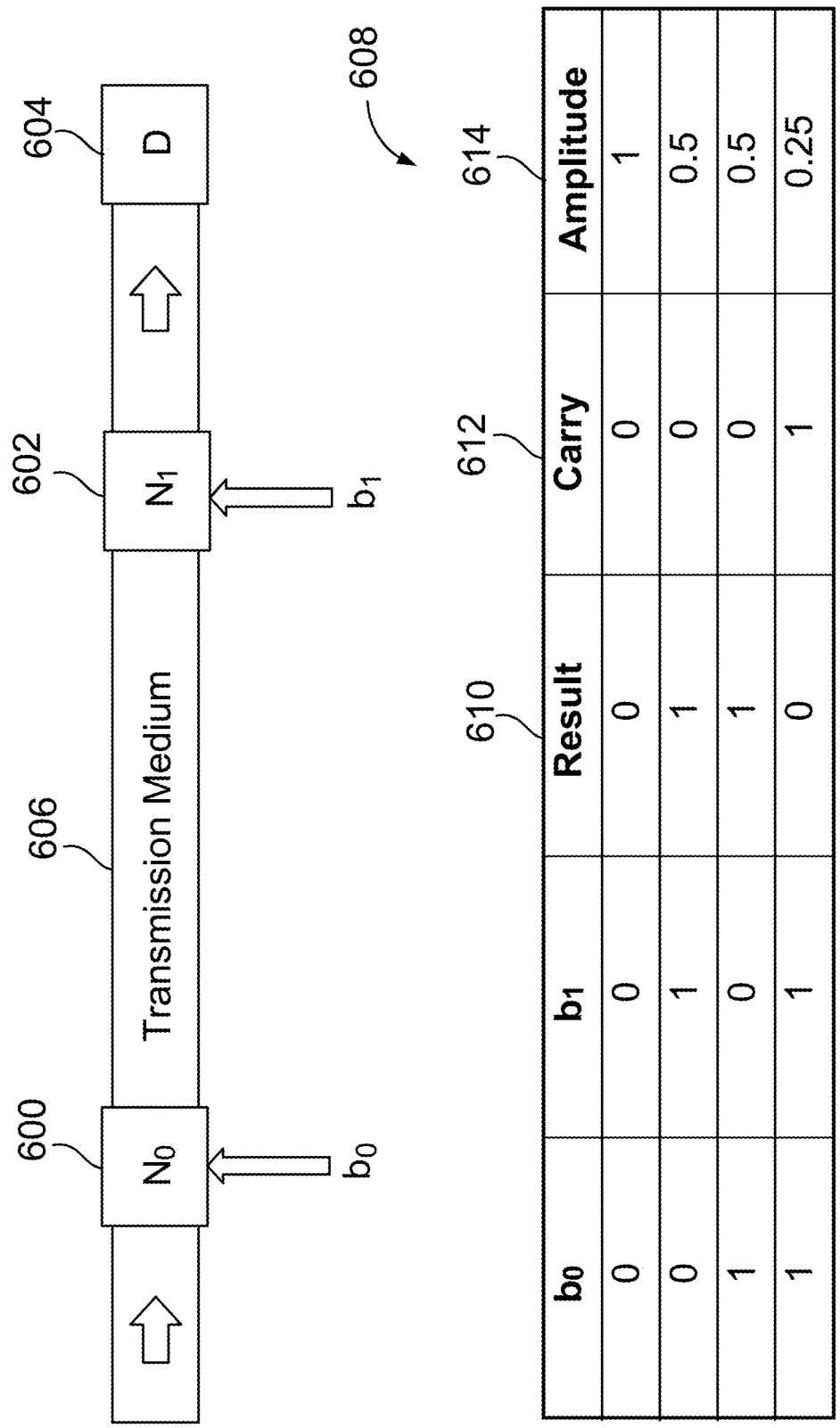
FIG. 6 is a schematic diagram of an example of a distributed PAM aggregation technique.

A simplified example of the distributed PAM aggregation technique is described with reference to FIG. 6. In this example, there are two nodes 600, 602 that each have a 1-bit value, and those values are to be added together with the result of the summation transmitted to a destination D 604 along a transmission medium 606. A node $N_0$ 600 has a bit $b_0$ and a node $N_1$ 602 has a bit $b_1$. The table 608 in FIG. 6 shows the different possible combinations of values for the 1-bit values and the corresponding values of a Result bit 610 and a Carry bit 612, which together represent the sum of the two 1-bit values. There is also an Amplitude value 614 that corresponds to the amplitude of a modulated signal that has been transmitted from a source onto the transmission medium 606 and past respective modulators at each of the nodes $N_0$ and $N_1$. The signal starts with a predetermined preliminary amplitude, which in this example is represented as an amplitude of 1. As the signal passes each node, the node either lets the signal pass by without changing the amplitude of the signal (corresponding to a modulation value of 1) if the 1-bit value is "0", or modulates the signal by a predetermined amplitude scaling factor (or "modulation depth") m if the 1-bit value is "1", where 0<m<1. Thus, a distributed summation operation is performed using a distributed multiplication operation.

In this example, the predetermined modulation depth is 0.5. Neglecting any small propagation losses that may be associated with transmission through each node's modulator, if both nodes have a 1-bit value of 0, the amplitude of the signal at the destination D 604 will still be 1. If either node has a 1-bit value of 1 and the other node has a 1-bit value of 0, then the amplitude of the signal at the destination D 604 will be 0.5. If both nodes have a 1-bit value of 1, then the amplitude of the signal at the destination D 604 will be 0.25. In other examples, the predetermined modulation depth can be different, but if the predetermined modulation depth is the same at each node, the amplitude value will represent a count of the number of nodes that had a "1" value. This technique can be scaled to any number of nodes at respective intermediate locations along the transmission medium 600. There can also be any number of 1-bit values transmitted in sequential time slots for addition of multi-bit values.

Figure 7:
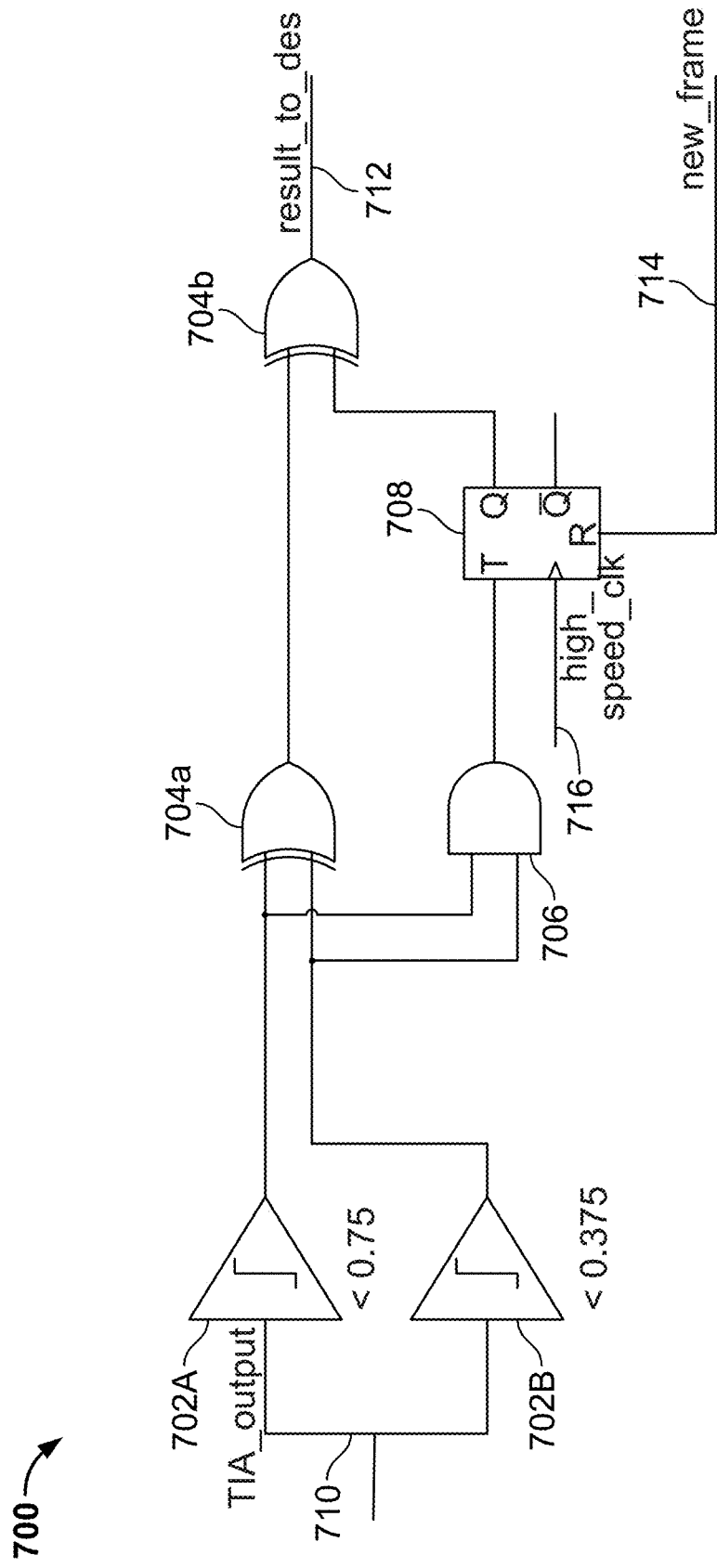
FIG. 7 is a circuit diagram of example digital logic for mapping an analog sum result to a digital sum result.

FIG. 7 shows an example of a digital logic circuit 700 that can be used to map a detected analog amplitude sum result 710 to a digital sum result 712 for the example of FIG. 6. At the input, the analog amplitude sum result 710 can be provided, for example, as a voltage of a transimpedance amplifier driven by the photocurrent of a photodetector that detects an optical wave in an optical waveguide used as the transmission medium 606. Only two comparators 702A and 702B with different comparison thresholds (0.75 and 0.375, respectively) are needed to distinguish between just three different possible amplitude values. The circuit then uses XOR gates 704a, 704b and an AND gate 706 along with a synchronous digital circuit element (e.g., flip-flop) 708 to provide a result 712 and an indication of each new frame 714. The timing for each bit corresponds to the timing of individual time slots of the optical wave, which can be controlled by a high speed clock signal 716.

In this example, the output of the XOR gate 704a is the result bit (similar to the result bit 610 in FIG. 6) and the output of the AND gate 706 is the carry bit (similar to the carry bit 612). The XOR gate 704b and the synchronous digital circuit element 708 are used to add the previous carry bit (if any) to the result bit for a series of 1-bit values that are being added. For example, two nodes can add arbitrarily long multi-bit values, one bit at a time, using the digital logic circuit 700. A similar principle can be used to implement a logic circuit with additional logic gates for mapping a detected analog amplitude sum result to a digital sum result when there are more than two nodes adding values together.

Figure 18A:
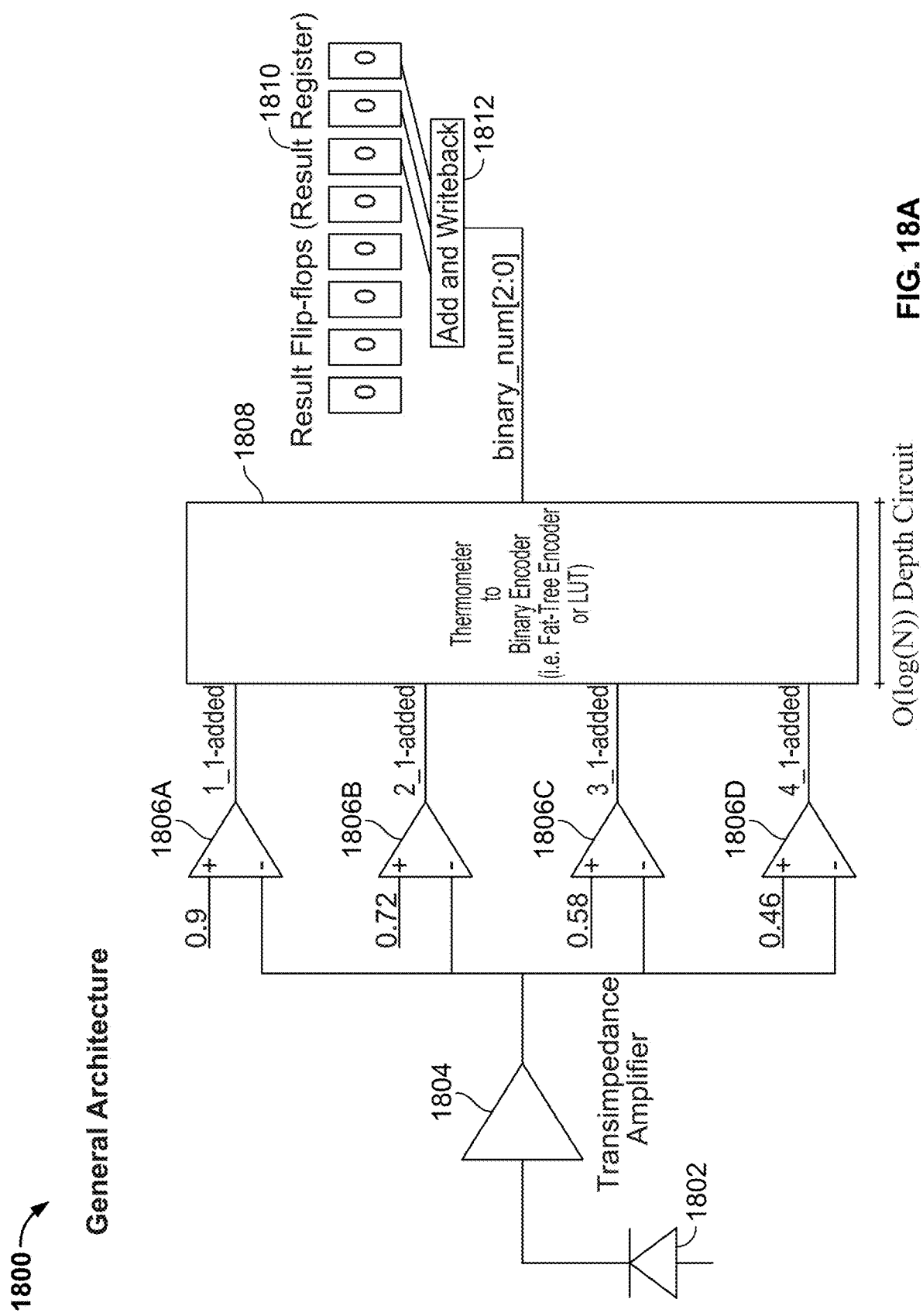
FIG. 18A is a diagram of an example of a general architecture of a digital logic circuit for mapping an analog sum result to a digital sum result.

For example, any of a variety of analog-to-digital converter (ADC) circuits can be used to convert a detected analog amplitude sum result to a digital sum, such as a circuit that uses a combination of comparators and encoding to implement a non-linear flash ADC. FIG. 18A shows an example of a circuit 1800 for computing a result of adding four summands from four respective nodes, where the multi-bit summands are provided one bit at a time in successive time slots. In this example, a scaling factor of 0.8 is used. If all four bits of the four summands are 0, the light traveling in the transmission medium (e.g., similar to 606 of FIG. 6) has an amplitude of 1. If one of the four bits of the four summands is 1, the light traveling in the transmission medium has an amplitude of 0.8. If two of the four bits of the four summands are 1, the light traveling in the transmission medium has an amplitude of 0.64. If three of the four bits of the four summands is 1, the light traveling in the transmission medium has an amplitude of 0.512. If all four bits of the four summands are 1, the light traveling in the transmission medium has an amplitude of 0.41. A threshold value of 0.9 can be used to distinguish between the values 1 and 0.8. A threshold value of 0.72 can be used to distinguish between the values 0.8 and 0.64. A threshold value of 0.58 can be used to distinguish between the values 0.64 and 0.512. A threshold value of 0.46 can be used to distinguish between the values 0.512 and 0.41.

A photodetector 1802 receives the light in the transmission medium and provides a photocurrent to a transimpedance amplifier 1804, which generates a voltage signal proportional to the photocurrent. There are four comparators in this example 1806A-1806D that compare the voltage signal (at the negative terminal) to four respective voltage thresholds (at the positive terminal) 0.46, 0.58, 0.72, and 0.9, to provide binary outputs corresponding to a 1 if the voltage signal is less than the threshold and a 0 if the voltage signal is greater than the threshold. The circuit 1800 also includes an encoder circuit 1808 that stores values in a result register 1810 (e.g., a set of flip-flops) and performs binary summation on a series of 1-bit values provided by the comparators 1806A to 1806D until a final result is generated.

For example, the encoder circuit 1808 can be a thermometer-to-binary encoder (e.g., a fat-tree encoder, which can be implemented using a look-up table). Additional information about fat-tree encoders can be found in the article "FAT TREE ENCODER DESIGN FOR ULTRA-HIGH SPEED FLASH A/D CONVERTERS" by Daegyu Lee et al., published in the 2002 45th Midwest Symposium on Circuits and Systems, 2002, the entire content of the article is herein incorporated by reference. Generally, thermometer-to-binary conversion has logarithmic circuit depth (as a function of the number of summands N), and the binary output result has a bitwidth that is equal to ceiling(log 2(N+1)) (e.g., a bitwidth of 4 in this example). Therefore, in this example, there are 3 bits to represent the possible sum results. This example of thermometer-to-binary encoding implicitly accounts for the output result bit and carry bits, as the next highest order bit(s) as the result bit shifts.

The circuit 1800 includes a register interface 1812 that is used by the encoder circuit 1808 when adding and writing back the partial results to the appropriate section of the result register 1810. In this addition step, the operands are the existing values in the register 1810 and the output from the encoder circuit 1808. The register interface 1812 can have a sliding window that can be implemented, for example, by using a shift register as the result register 1810.

Figure 18B:
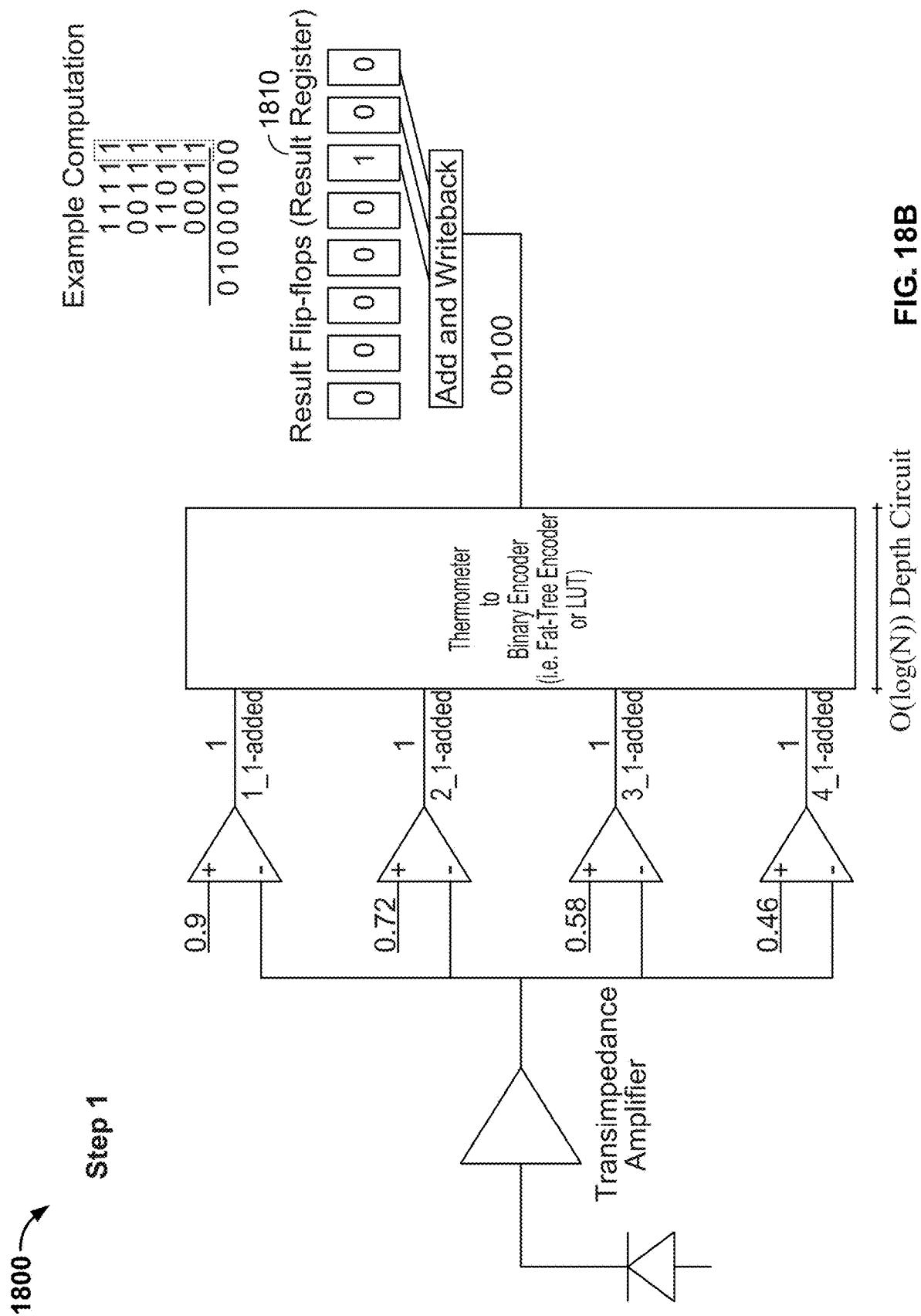
FIGS. 18B to 18F are diagrams showing examples of states of the digital logic circuit when used to add four summands and map the analog sum result to the digital sum result.

FIGS. 18B to 18F show an example of the digital logic circuit 1800 being used to add the four summands 31, 7, 27, and 3 (encoded as binary values 11111, 00111, 11011, and 00011, respectively), yielding a final result of 68 (encoded as binary value 01000100). FIG. 18B shows a state of the circuit 1800 in which the four 1-bit values of the lowest order bit of each summand are: 1, 1, 1, 1. The corresponding comparator outputs for this lowest level analog value (from highest threshold to lowest) are: 1, 1, 1, 1. The bits written to the result register 1810 (for bit positions 2, 1, 0) are: 1, 0, 0 (representing 1+1+1+1=4).

Figure 18C:
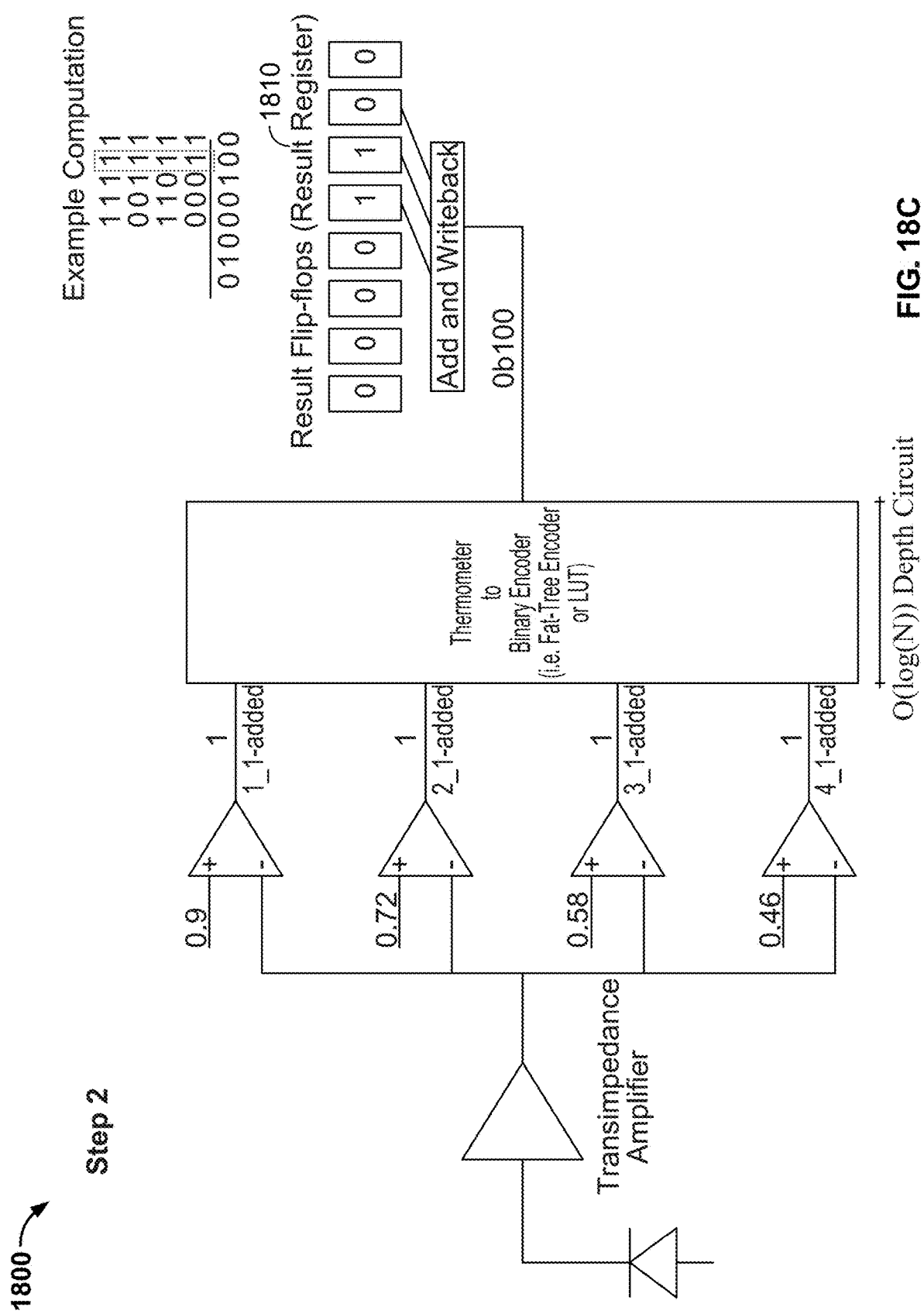

FIG. 18C shows a state of the circuit 1800 in which the four 1-bit values of the lowest order bit of each summand are: 1, 1, 1, 1. The corresponding comparator outputs for this lowest level analog value (from highest threshold to lowest) are: 1, 1, 1, 1. The bits written to the result register 1810 (for bit positions 3, 2, 1) are: 1, 1, 0 (representing 1+1+1+1+2 (carry)=6).

Figure 18D:
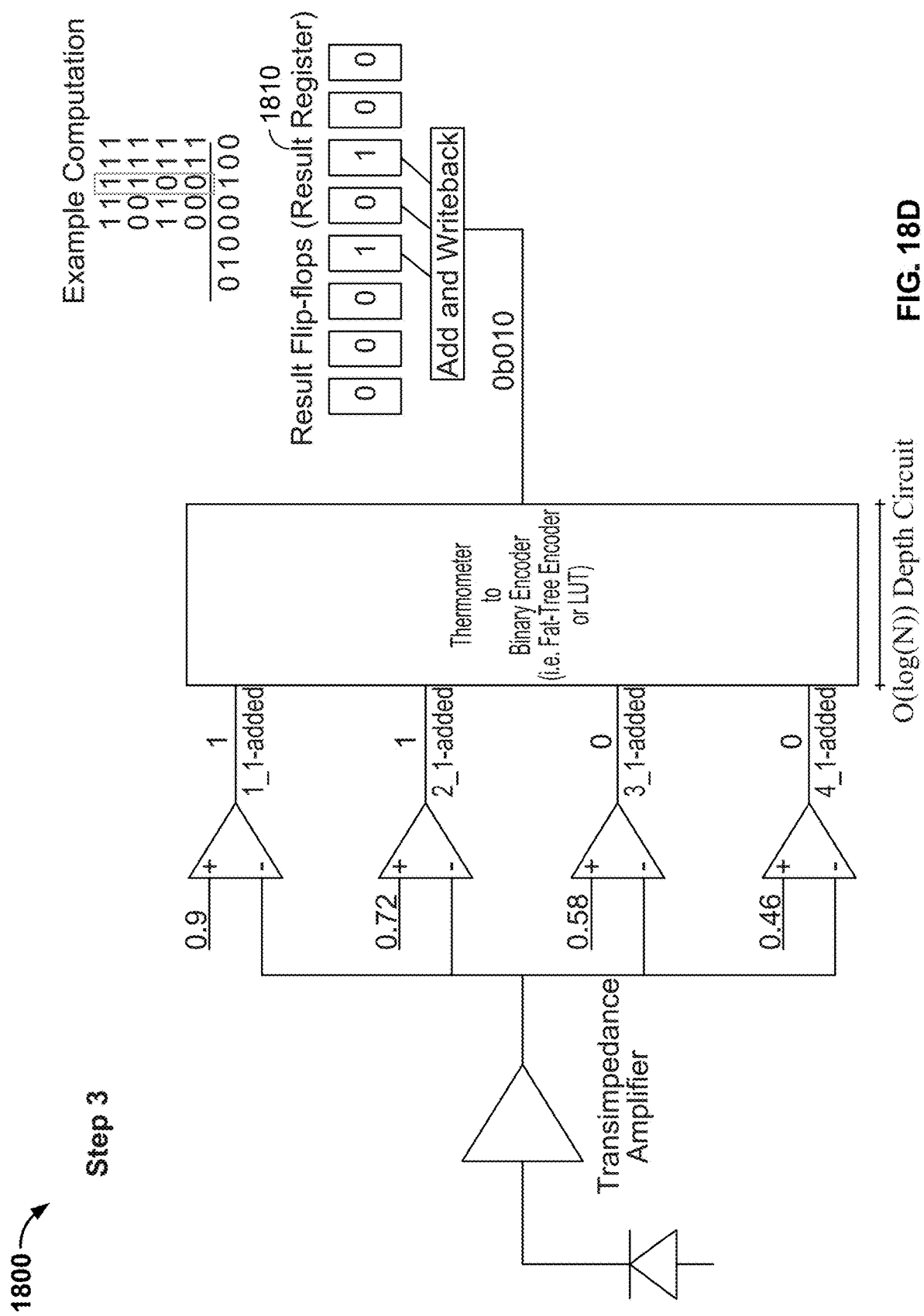

FIG. 18D shows a state of the circuit 1800 in which the four 1-bit values of the lowest order bit of each summand are: 1, 1, 0, 0. The corresponding comparator outputs for this mid-level analog value (from highest threshold to lowest) are: 1, 1, 0, 0. The bits written to the result register 1810 (for bit positions 4, 3, 2) are: 1, 0, 1 (representing 1+1+0+0+3 (carry)=5).

Figure 18E:
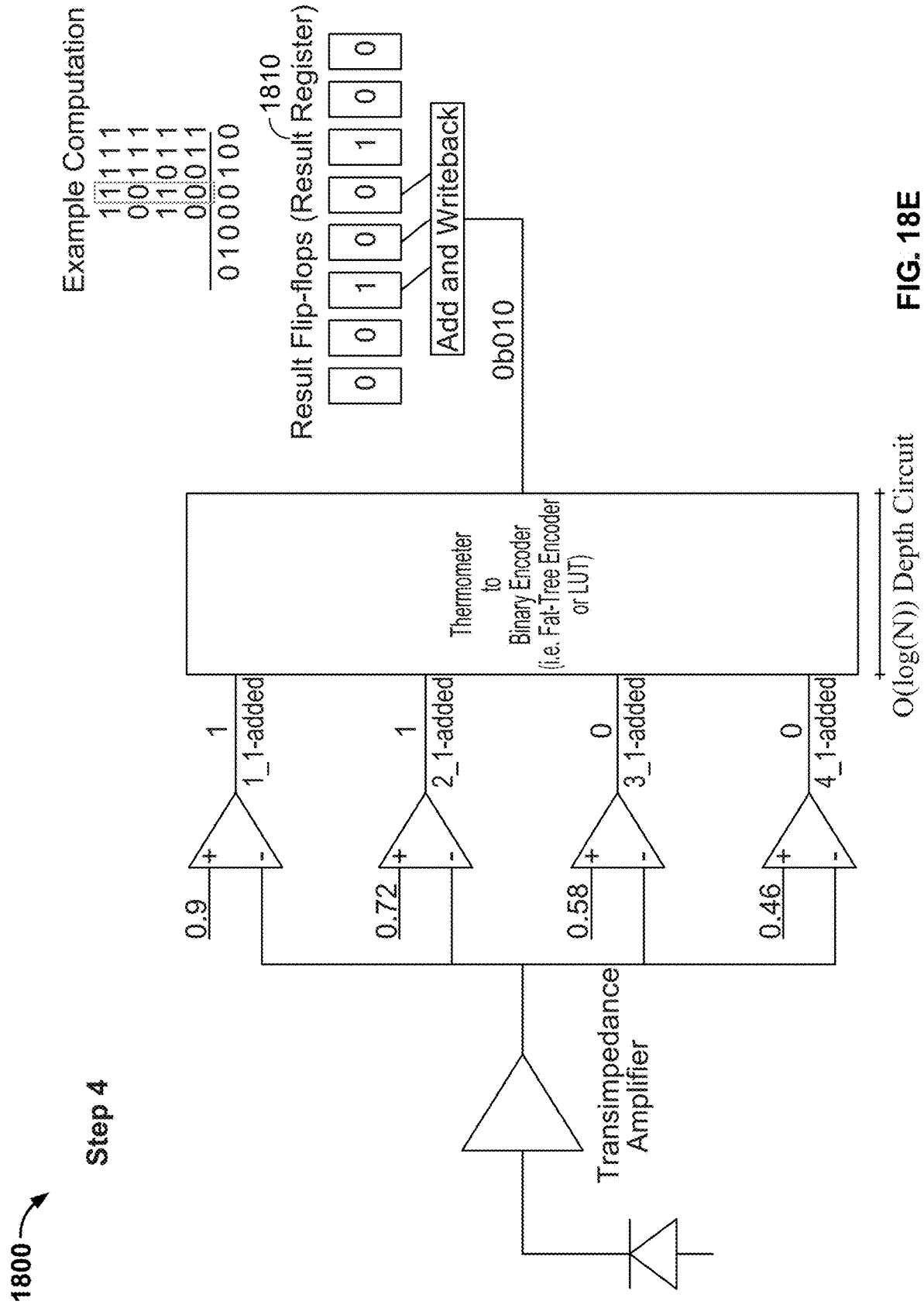

FIG. 18E shows a state of the circuit 1800 in which the four 1-bit values of the lowest order bit of each summand are: 1, 0, 1, 0. The corresponding comparator outputs for this mid-level analog value (from highest threshold to lowest) are: 1, 1, 0, 0. The bits written to the result register 1810 (for bit positions 5, 4, 3) are: 1, 0, 0 (representing 1+0+1+0+2 (carry)=4).

Figure 18F:
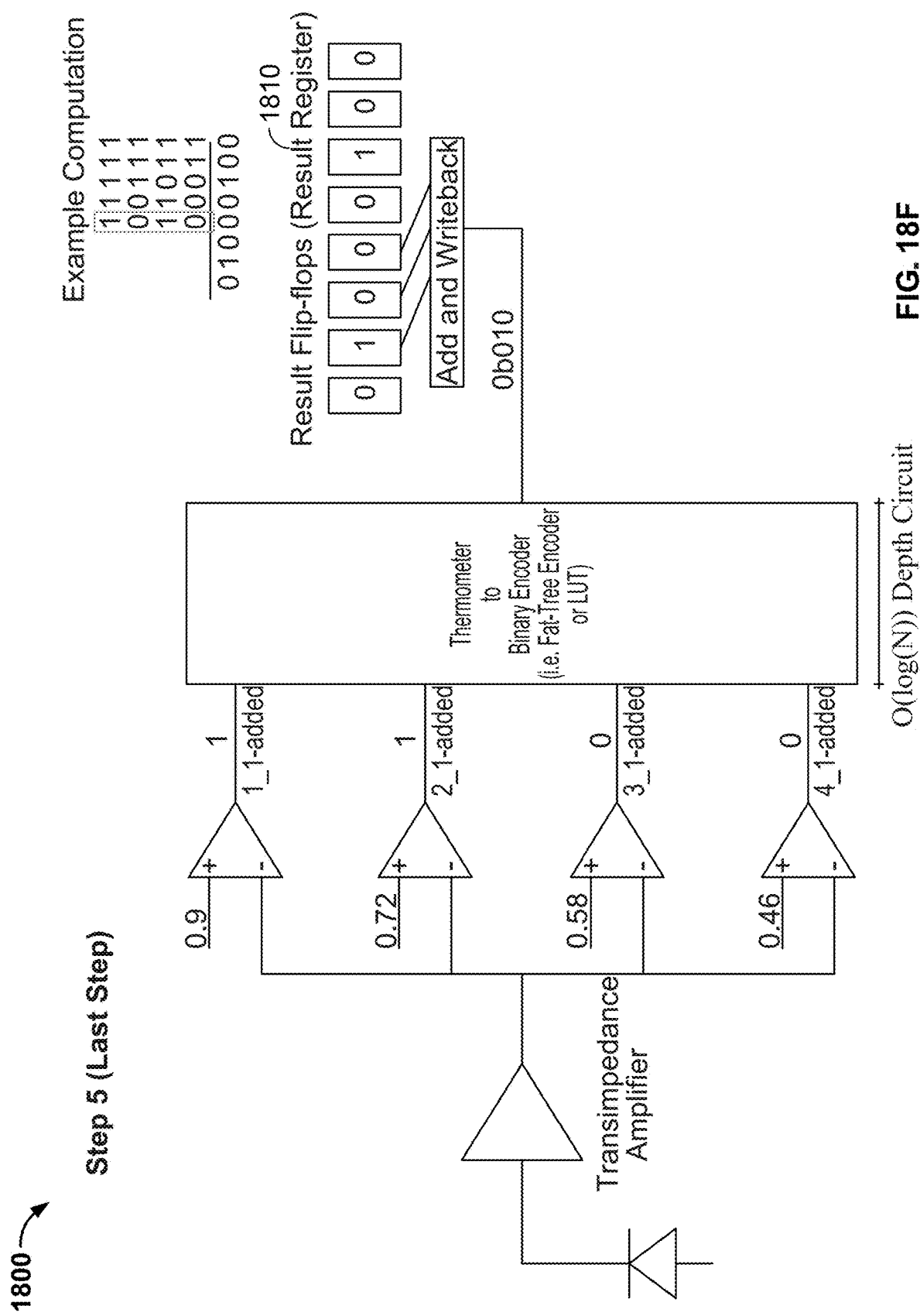

FIG. 18F shows a state of the circuit 1800 in which the four 1-bit values of the lowest order bit of each summand are: 1, 0, 1, 0. The corresponding comparator outputs for this mid-level analog value (from highest threshold to lowest) are: 1, 1, 0, 0. The bits written to the result register 1810 (for bit positions 6, 5, 4) are: 1, 0, 0 (representing 1+0+1+0+2 (carry)=4). The final results of the summation stored in the result register 1810 is the binary value 01000100.

Figure 8A:
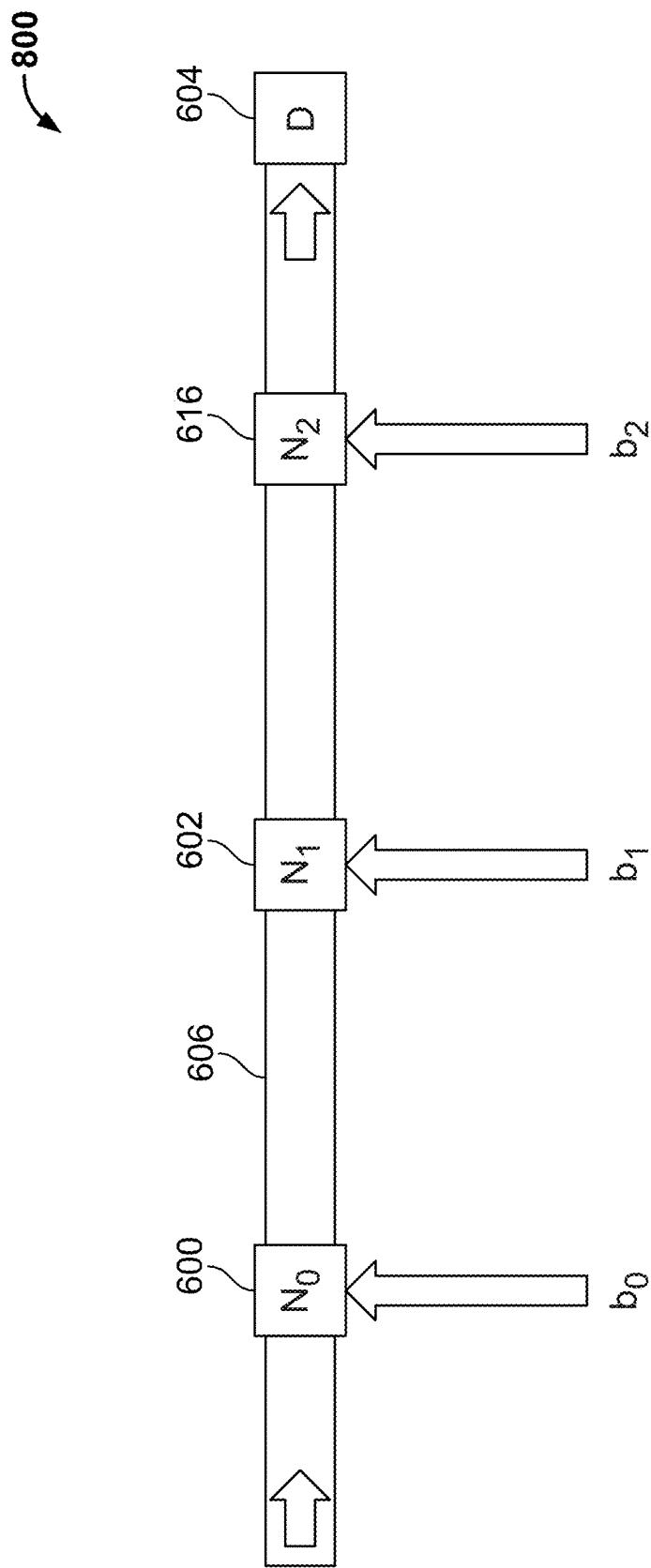
FIG. 8A is a schematic diagram of an example of a distributed PAM aggregation technique.

FIG. 8A is a diagram 800 of an example of the distributed PAM aggregation technique for adding three 1-bit values $b_0$, $b_1$, and $b_2$ held by nodes $N_0$ (600), $N_1$ (602), and $N_2$ (616), respectively. The three 1-bit values $b_0$, $b_1$, and $b_2$ are added together with the result of the summation transmitted to a destination D 604 along a transmission medium 606.

Figure 8B:
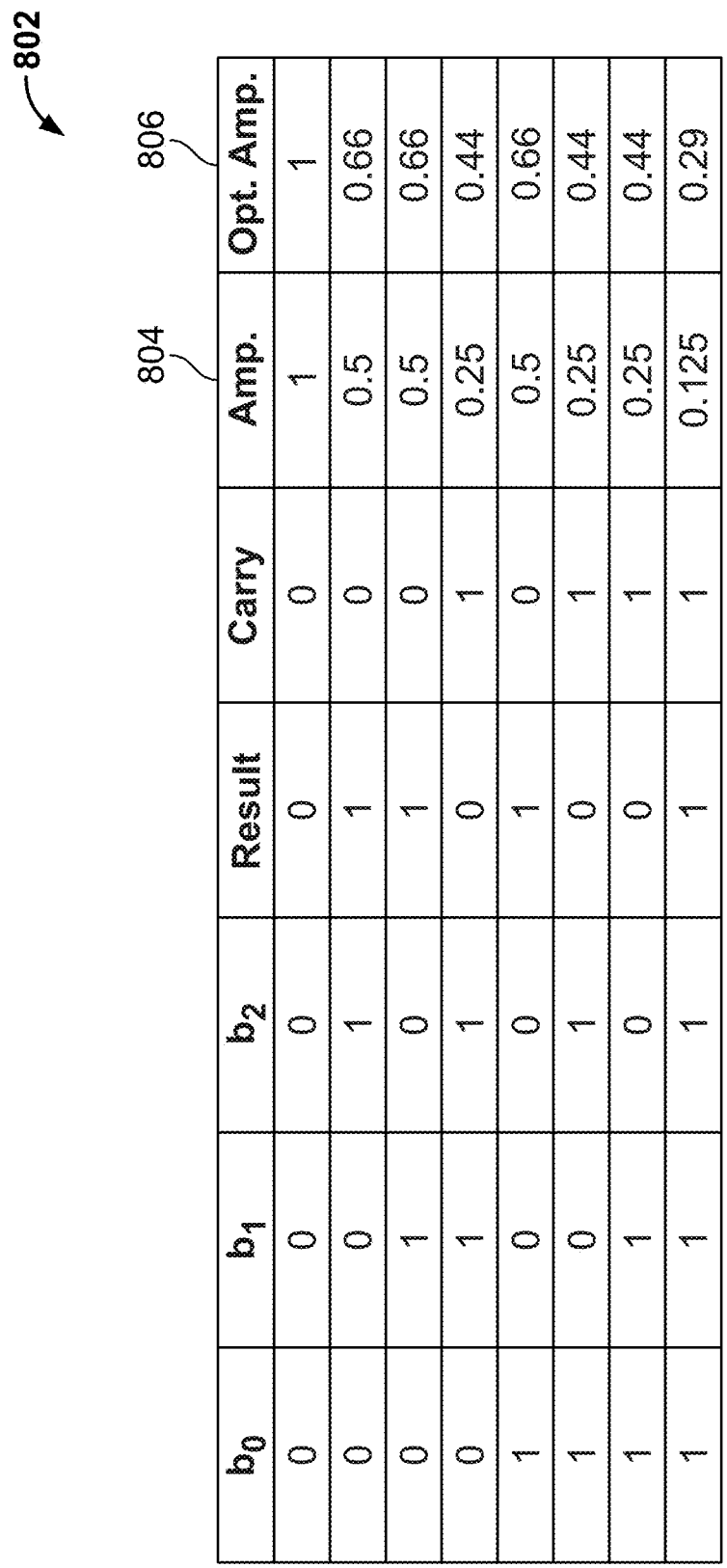
FIG. 8B is a table of an example of bits that are summed to yield an analog amplitude.

FIG. 8B shows a table 802 for aggregating 1-bit values (e.g., $b_0$, $b_1$, $b_2$) from three nodes (e.g., $N_0$, $N_1$, $N_2$) at intermediate locations along a transmission medium (e.g., 606). As in the previous example, since only the total sum is needed at the destination, the fact that different possible combinations of 1-bit values can result in the same received signal amplitude does not matter. In this example, there are only four different possible amplitude values, so the number of comparisons needed in this case is three instead of two. In general, the number of comparisons needed will scale with the number of nodes. There will also be additional result and/or carry bits needed for additional nodes. The figure shows an Amplitude value 804 where the predetermined modulation depth used by each node is 0.5 as in the previous example, but also shows an Optimized Amplitude value 806 where the predetermined modulation value used by each node is 0.66 (rounded to the nearest two decimal places). Using the Amplitude based on a 0.5 modulation depth, the step size between the two smallest values 0.125 and 0.25 is 0.125. By comparison, with the Optimized Amplitude 806 based on a 0.66 modulation depth, the larger step size between the two smallest values 0.29 and 0.44 is 0.15.

The following is an example of a calculation for determining an optimal value of the predetermined modulation depth m, where k is the number of summands being added together (and also the number of modulators at intermediate locations along the transmission medium). The step size between different amplitudes that are the closest to each other (also called the minimum step size), and therefore the most difficult to resolve for a given signal-to-noise ratio, is the step size between all k modulators applying the predetermined modulation depth and k−1 modulators applying the predetermined modulation depth. Thus, the optimum modulation depth is determined by maximizing that minimum step size, as follows.

$$\text{step}_{k-1,k} = m^{k-1} - m^k = m^{k-1}(1-m)$$

$$\frac{\partial}{\partial m}\text{step}_{k-1,k} = (k-1)m_{opt}^{k-2} - km_{opt}^{k-1} = 0$$

$$\to m_{opt} = \frac{k-1}{k}$$

Thus, a feature of the optimized technique is that, as more nodes are added, the optimal modulation depth grows, which makes the modulation more power efficient. The minimum step size can be increased when the predetermined amplitude scaling factor S is substantially equal to (k−1)/k, as compared to when the amplitude scaling factor S is some other value. Here the term "substantially equal" to a value means equal to within ±10% of the value.

Figure 9:
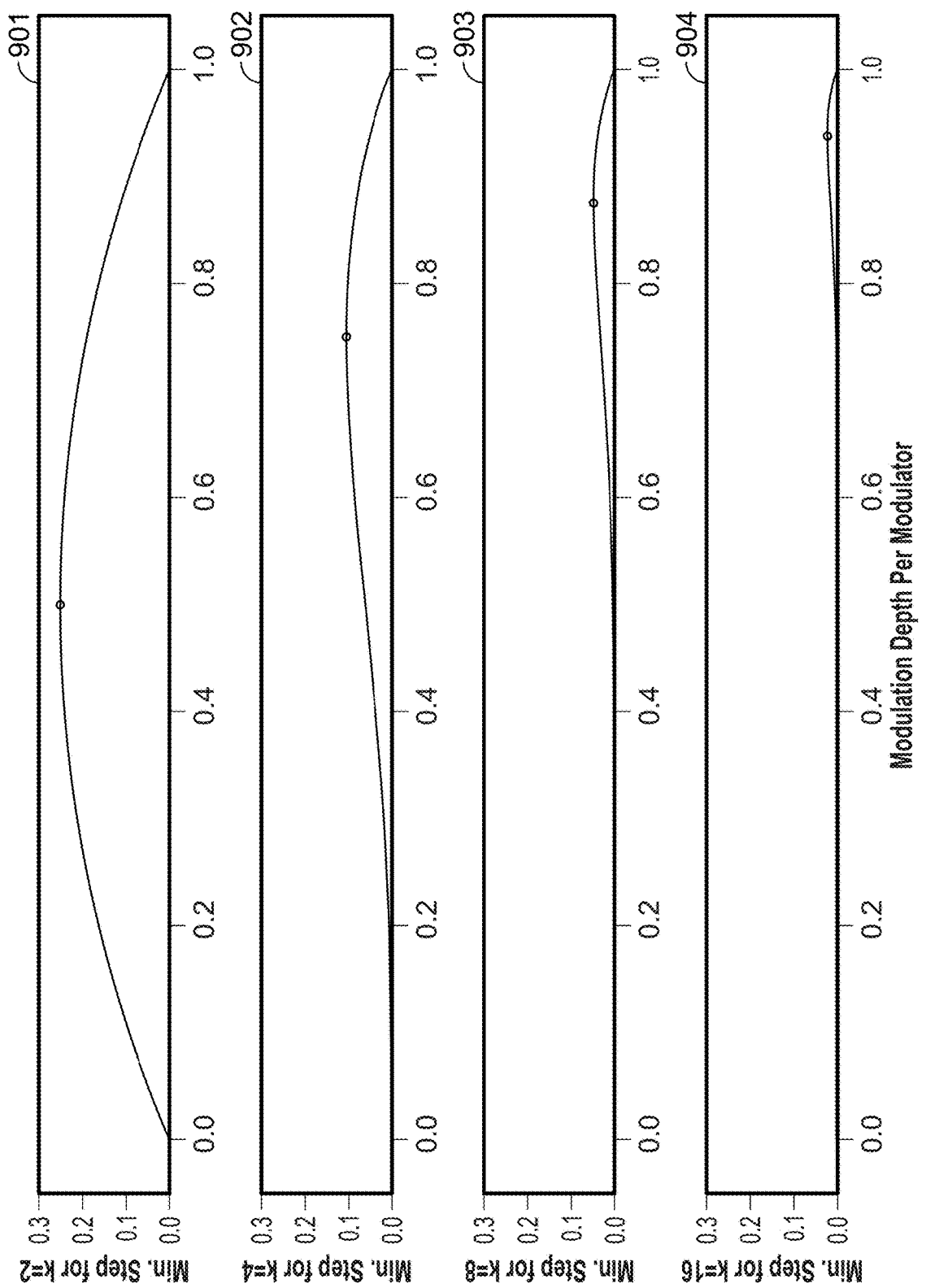
FIG. 9 is a set of plots of minimum step size as a function of modulation depth.

FIG. 9 shows an example of different plots of a value of a minimum step size for a given value of k as a function of modulation depth per modulator. Plot 901 uses k=2, plot 902 uses k=4, plot 903 uses k=8, and plot 904 uses k=16. Here, k is the number of summands being added together, and also the number of modulators at intermediate locations along the transmission medium. For each value of k, an optimal predetermined modulation depth occurs at the maximum of the minimum step size. By maximizing the minimum step size that needs to be resolved between the two amplitude values that are closest to each other, there is less sensitivity to noise, which optimizes the performance by reducing the error rate for a given signal-to-noise ratio.

The following is an example of a calculation showing that the optimal modulation depth applied by k−1 nodes (relatively quickly) approaches 1/e as k grows.

$$\lim_{k\to\infty}\left(\frac{k-1}{k}\right)^{k-1} = \lim_{k\to\infty}\left(\frac{k}{k+1}\right)^k = \lim_{k\to\infty}\left(\frac{1}{1+\frac{1}{k}}\right)^k$$

$$\lim_{k\to\infty}\left(\frac{k-1}{k}\right)^{k-1} = \frac{1}{e}$$

Figure 10:
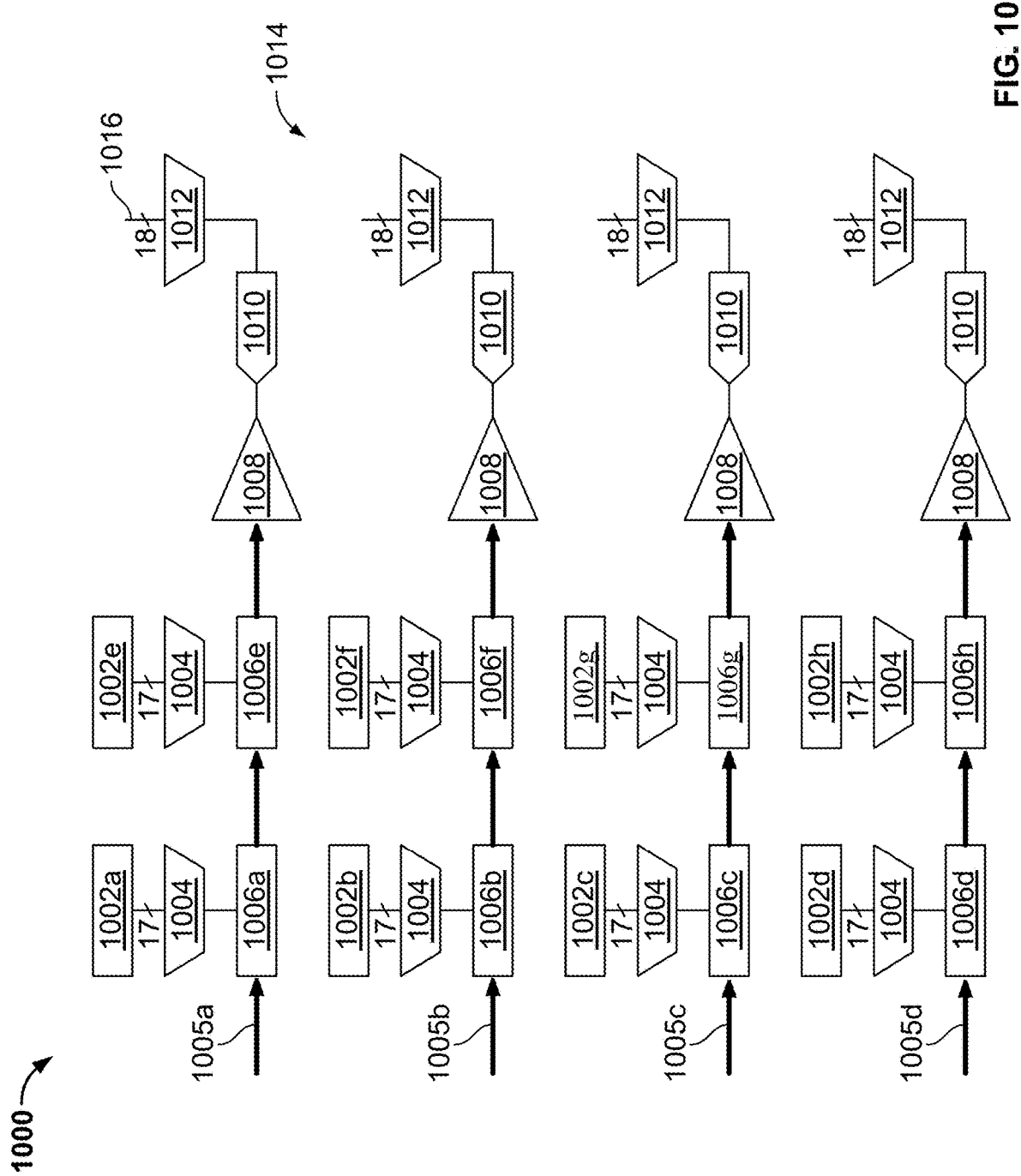
FIG. 10 is a schematic diagram of an example system configuration.

FIG. 10 shows an example configuration 1000 for using distributed PAM aggregation in a system 1014 that performs 4×4 matrix multiplication using 8-bit multiplication. The data elements in the input vector and the coefficients in the weight matrix are multiplied electronically as digital values. There are spatially distributed partial sums that are added in summation modules 1002 to produce 17-bit intermediate results. There are eight summation modules 1002a to 1002h. The summation modules 1002a, 1002b, 1002c, 1002d can be similar to, e.g., the adders 510a, 510b, 510c, 510d, respectively, of FIG. 5C. The summation modules 1002e, 1002f, 1002g, 1002h can be similar to, e.g., the adders 512a, 512b, 512c, 512d, respectively. Bits of each partial sum are serialized in serializers 1004 and aggregated onto an optical transmission medium 1005 using a modulator 1006, such as a high-speed underdriven binary segmented carrier injection modulator (SCIM), to provide a sequence of optical intensities that are received at optical-to electronic receiver modules 1008 that include circuitry (e.g., continuous-time linear equalizer (CTLE) circuitry, and/or transimpedance amplifier (TIA) circuitry) for generating an amplified analog electrical signal. The transmission medium 1005 can be similar to the transmission medium 514 of FIG. 5C.

For example, the partial sum generated by the summation module 1002a and the partial sum generated by the summation module 1002e are aggregated onto the optical transmission medium 1005a using modulators 1006a and 1006e. This is similar to the example in FIG. 5 in which the partial sum generated by the adder 510a and the partial sum generated by the adder 512a are aggregated onto the transmission medium 514A. Similarly, the partial sum generated by the summation module 1002b and the partial sum generated by the summation module 1002f are aggregated onto the optical transmission medium 1005b using modulators 1006b and 1006f. The partial sum generated by the summation module 1002c and the partial sum generated by the summation module 1002g are aggregated onto the optical transmission medium 1005c using modulators 1006c and 1006g. The partial sum generated by the summation module 1002d and the partial sum generated by the summation module 1002h are aggregated onto the optical transmission medium 1005d using modulators 1006d and 1006h.

In some implementations, different bits of the 17-bit intermediary results are aggregated onto the transmission medium 1005 at different time slots. The serializer 1004 serializes the 17-bit intermediary result into 17 1-bit values. The 17 1-bit values of the intermediary result generated by the summation module 1002a and the 17 1-bit values of the intermediary result generated by the summation module 1002e are aggregated onto the transmission medium 1005 at 17 consecutive time slots. For example, at time slot 0, bit 0 of the summation module 1002a and bit 0 of the summation module 1002e are aggregated onto the transmission medium 1005a. At time slot 1, bit 1 of the summation module 1002a and bit 1 of the summation module 1002e are aggregated onto the transmission medium 1005a. At time slot 16, bit 16 of the summation module 1002a and bit 16 of the summation module 1002e are aggregated onto the transmission medium 1005a. The optical signals on the optical transmission medium 1005 at time slots 0 to 16 represent bit 0 to bit 16 of the sum of the 17-bit intermediate result produced by the summation module 1002a and the 17-bit intermediate result produced by the summation module 1002e.

Analog-to-digital modules 1010 provide digital sum-carry values that are provided to deserializers 1012 to be deserialized into an 18-bit sum 1016. Carrier-injection absorption amplitude modulators are useful in some implementations, for example, due to thermal stability, which helps with reproducibility of the predetermined modulation depth at multiple modulators. In some implementations, no single binary segmented carrier injection modulator (SCIM) is driven at full-scale (hence the term "underdriven"), enabling modulator driver power/area to be reduced significantly. A variety of alternative configurations can be used. For example, different types of modulators can be used, including Mach-Zehnder Interferometers, or ring modulators. Some configurations can use multiple optical wavelengths enabling a lower serializer-deserializer (SERDES) frequency to be used.

Figure 11A:
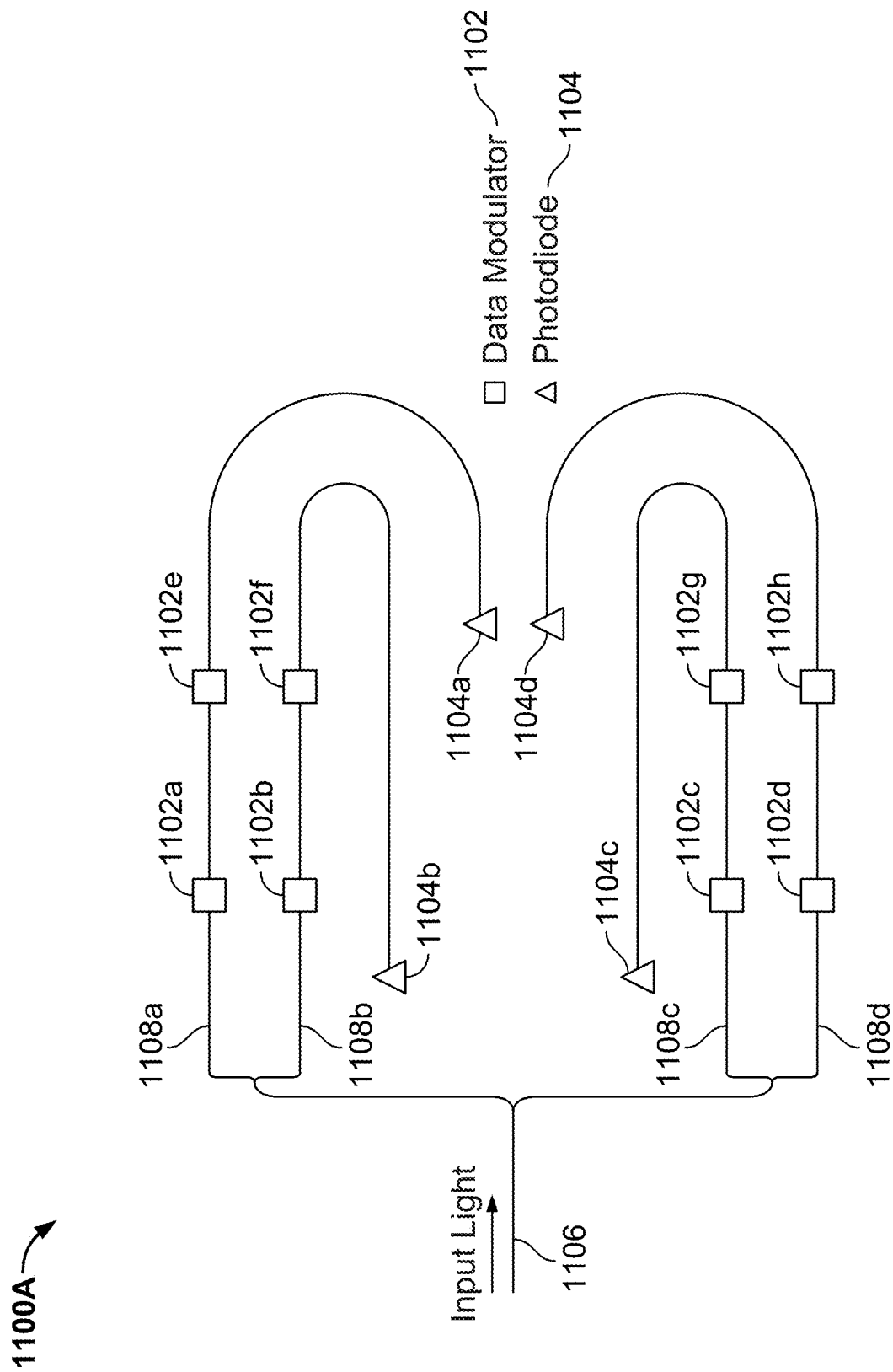
FIGS. 11A and 11B are schematic diagrams of example system layouts.
Figure 11B:
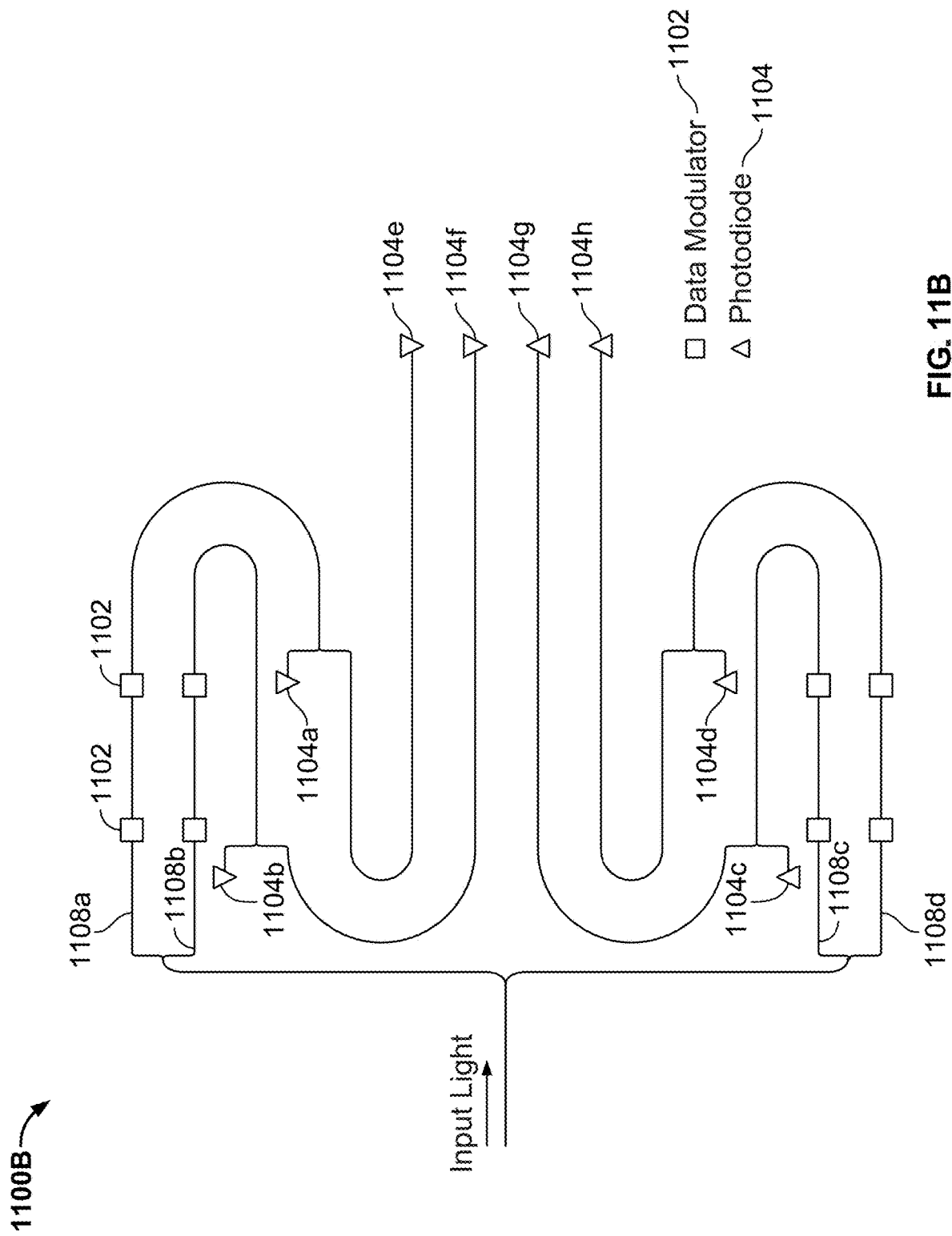

FIGS. 11A and 11B show various example layouts 1100A and 1100B, respectively, of systems that distribute and aggregate partial results using the distributed PAM aggregation technique. In FIG. 11A, input light 1006 is distributed to four branches of waveguides 1108a, 1108b, 1108c, 1108d. There are two data modulators 1102a, 1102e along the branch of waveguide 1108a, with a photodiode 1104a at the end of the waveguide 1108a. The data modulators 1102a, 1102e can be similar to the modulators 1006a, 1006e of FIG. 10. There are two data modulators 1102b, 1102f along the branch of waveguide 1108b, with a photodiode 1104b at the end of the waveguide 1108b. The data modulators 1102b, 1102f can be similar to the modulators 1006b, 1006f of FIG. 10. There are two data modulators 1102c, 1102g along the branch of waveguide 1108c, with a photodiode 1104c at the end of the waveguide 1108c. The data modulators 1102c, 1102g can be similar to the modulators 1006c, 1006g of FIG. 10. There are two data modulators 1102d, 1102h along the branch of waveguide 1108d, with a photodiode 1104d at the end of the waveguide 1108d. The data modulators 1102d, 1102h can be similar to the modulators 1006d, 1006h of FIG. 10.

In FIG. 11B there are also two data modulators 1102 along each of four branches of waveguides with photodiodes 1104 at the ends of the waveguides, and there are additional photodiodes 1104 at the end of waveguides that split off from the four waveguides providing multiple destinations for each branch (e.g., to locally save the aggregated results). For example, the optical signal in the waveguide 1108a is split and sent to photodiodes 1104a and 1104e, the optical signal in the waveguide 1108b is split and sent to photodiodes 1104b and 1104f, the optical signal in the waveguide 1108c is split and sent to photodiodes 1104c and 1104g, and the optical signal in the waveguide 1108d is split and sent to photodiodes 1104d and 1104h. Thus, the destination at which the result is provided is not necessarily at the end of the waveguide.

A variety of other systems can use the distributed PAM aggregation technique to perform a summation of binary values within different time slots along a transmission medium. For example, in addition to a wafer-scale system that uses an interposer to provide an optical waveguide as the transmission medium, the system can connect different nodes (e.g., server racks) in a data center using an optical fiber as the transmission medium. Also, some systems can use electrical modulators to aggregate binary values encoded on electrical signals transmitted along an electrical transmission line.

In some implementations, in the example of FIG. 1, two or more computing nodes 102 can be made on a same substrate, then connected to the OIIC 104 in a controlled collapsed chip connection. Different computing nodes 102 do not necessarily have to be on separate dies, one semiconductor die can support multiple computing nodes 102. In some implementations, each of the computing nodes 102 includes circuitry formed on a substrate, and the circuitry is electrically and optically coupled to the OIIC 104 through the substrate of the computing node 102, e.g., by vertical electric contacts such as vias and vertically coupling elements. The computing nodes 102 do not necessarily have to be "flipped" in order to connect to the OIIC 104.

In some implementations, distributed computing can use a distributed phase modulation aggregation technique in which two or more nodes including phase modulators are positioned along a path of an optical signal. The optical signal starts with a predetermined preliminary phase, e.g., a phase of 0. As the signal passes each node, the node either lets the signal pass by without changing the phase of the signal (corresponding to a modulation value of 1) if the 1-bit value is "0", or modulates the signal by a predetermined phase delay if the 1-bit value is "1". Thus, a distributed summation operation is performed using a distributed phase delay operation. At the destination, a decoding circuit is configured to map a detected phase of the detected signal using a predetermined phase scale that indicates a number of modulators by which the signal was modulated.

In some implementations, distributed computing can use a distributed polarization modulation aggregation technique in which two or more nodes including polarization modulators are positioned along a path of an optical signal. The optical signal starts with a predetermined preliminary polarization. As the signal passes each node, the node either lets the signal pass by without changing the polarization of the signal (corresponding to a modulation value of 1) if the 1-bit value is "0", or modulates the signal by a predetermined polarization change if the 1-bit value is "1". Thus, a distributed summation operation is performed using a distributed polarization modification operation. At the destination, a decoding circuit is configured to map a detected polarization of the detected signal using a predetermined polarization scale that indicates a number of modulators by which the signal was modulated.

In some implementations, distributed computing can use an aggregation of two or more optical characteristics, e.g., amplitude and phase, amplitude and polarization, or phase and polarization. For example, a process for distributed computing can include transmitting a signal having a predetermined preliminary first optical characteristic and a predetermined preliminary second optical characteristic from a source onto a transmission medium, modulating the first or second optical characteristic of the signal at each of a plurality of intermediate locations between the source and a destination by a selected modulation value, detecting the signal at the destination after transmission past the intermediate locations, and mapping detected first and second optical characteristics of the detected signal using a predetermined scale that indicates a number of intermediate locations at which the signal was modulated. For example, the first optical characteristic can be amplitude and the second optical characteristic can be phase. For example, the first optical characteristic can be amplitude and the second optical characteristic can be polarization. For example, the first optical characteristic can be phase and the second optical characteristic can be polarization.

Figure 12:
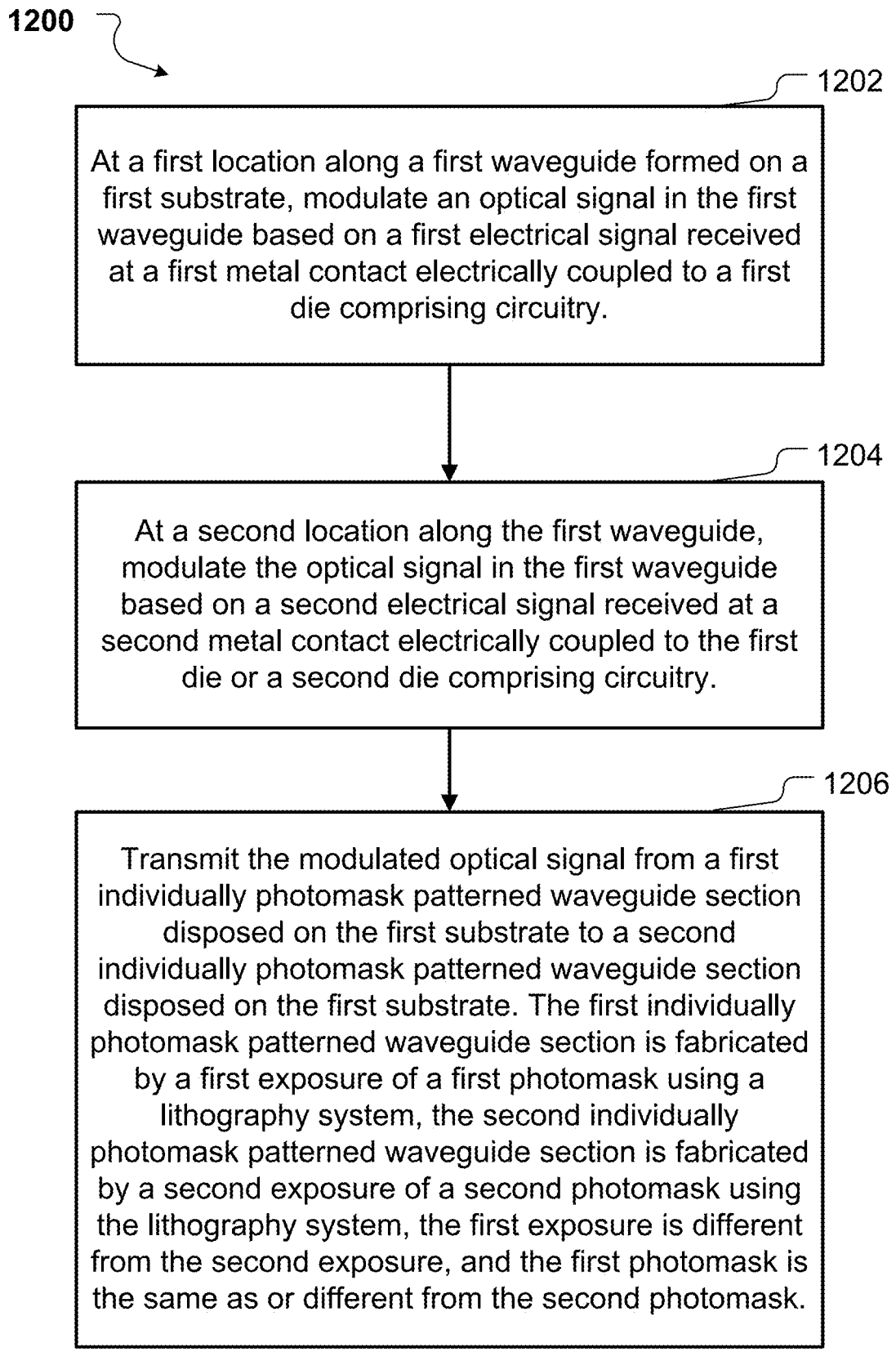

FIG. 12 is a flow diagram of an example of a process 1200 for modulating optical signals. The process 1200 includes the following steps:

Step 1202: At a first location along a first waveguide formed on a first substrate, modulate an optical signal in the first waveguide based on a first electrical signal received at a first metal contact electrically coupled to a first die comprising circuitry. For example, the first waveguide can be similar to the waveguide 514 of FIG. 5C or the transmission medium 606 of FIG. 6, the first substrate can be similar to the package substrate 112 (FIG. 1) or the substrate 234 (FIG. 5C), the first metal contact can be similar to the metal contact 236a or 236b, the first die can be similar to the EIC 221B or the node $N_0$, and the first location can be similar to the location of the node $N_0$ 600.

Step 1204: At a second location along the first waveguide, modulate the optical signal in the first waveguide based on a second electrical signal received at a second metal contact electrically coupled to the first die or a second die comprising circuitry. The second die can be similar to the node $N_1$ 602, and the second location can be similar to the location of the node $N_1$ 602.

Step 1206: Transmit the modulated optical signal from a first individually photomask patterned waveguide section disposed on the first substrate to a second individually photomask patterned waveguide section disposed on the first substrate. The first individually photomask patterned waveguide section is fabricated by a first exposure of a first photomask using a lithography system, the second individually photomask patterned waveguide section is fabricated by a second exposure of a second photomask using the lithography system, the first exposure is different from the second exposure, and the first photomask is the same as or different from the second photomask.

The process 1200 can include one or more of the following features. For example, the first metal contact can be located at a first region that corresponds to the first individually photomask patterned waveguide section, and the second metal contact can be located at a second region that corresponds to the second individually photomask patterned waveguide section.

The process 1200 can include detecting the modulated optical signal at a destination location downstream of intermediate locations where the optical signal is modulated to generate a detected signal; and mapping a detected amplitude of the detected signal using a predetermined amplitude scale that indicates a number of intermediate locations at which the signal was modulated. For example, the photodiodes 1104 (FIGS. 11A, 11B) can be used to detect the modulated optical signal. A digital logic circuit similar to the circuit 700 in FIG. 7 can be used to map the detected amplitude of the detected signal using the predetermined amplitude scale.

The first individually photomask patterned waveguide section can be fabricated by a first exposure of a first photomask using a lithography system, the second individually photomask patterned waveguide section can be fabricated by a second exposure of a second photomask using the lithography system, and the first exposure is different from the second exposure. The first photomask can be the same as or different from the second photomask The first metal contact can be electrically coupled to the first die in a controlled collapsed chip connection. For example, this can be similar to the example of FIG. 1 in which each computing node 102 is implemented on a semiconductor die that is connected to the OIIC 104 in a controlled collapsed chip connection.

The first die can include a semiconductor die. The first substrate can include a semiconductor substrate. The second metal contact can be electrically coupled to the second die, and the method can include transmitting the modulated optical signal along the first waveguide across the at least one boundary between individually photomask patterned waveguide sections.

The first location and the second location along the first waveguide can be located on a same individually photomask pattered waveguide section. The first location and the second location along the first waveguide can be located on different individually photomask pattered waveguide sections.

The process 1200 can include filtering, using a filter capacitor disposed on the first substrate, a signal on the first die or the second die, in which the first die or the second die includes a second substrate different from the first substrate. For example, the first substrate can be similar to the substrate 234 of FIG. 2B, the filter capacitor can be similar to the capacitor 238, and the first die can be similar to the EIC 221A.

The process 1200 can include decoupling, using a decoupling capacitor disposed on the first substrate, a first circuitry portion from a second circuitry portion, in which the first circuitry portion is on the first or second die, and the second circuitry portion is on the first or second die. For example, the first substrate can be similar to the substrate 234 of FIG. 2B, the decoupling capacitor can be similar to the capacitor 238, the first die can be similar to the EIC 221A, and the second die can be similar to the EIC 221B.

FIG. 13 is a flow diagram of an example of a process 1300 for fabricating an integrated circuit interposer. The process 1300 includes the following steps.

Step 1302: Form on a semiconductor wafer a first metal contact layer, at a first surface of the integrated circuit interposer, including a plurality metal contact sections. The metal contact sections include a first metal contact section that includes a plurality of metal contacts arranged for electrically coupling to a first semiconductor die in a controlled collapsed chip connection, and a second metal contact section that includes a plurality of metal contacts arranged for electrically coupling to a second semiconductor die in a controlled collapsed chip connection.

Step 1304: Form on the semiconductor wafer a first patterned layer, at a first distance from the semiconductor substrate layer, including individually patterning a plurality of metal path sections.

Step 1306: Form on the semiconductor wafer a second patterned layer, at a second distance from the semiconductor substrate layer different from the first distance, including individually patterning a plurality of waveguide sections. The second patterned layer includes a first waveguide that crosses at least one boundary between individually photomask patterned waveguide sections, a first modulator coupled to the first waveguide at a first location along the first waveguide for modulating an optical wave in the first waveguide based on an electrical signal received at a first metal contact in the first metal contact section, and a second modulator coupled to the first waveguide at a second location along the first waveguide for modulating the optical wave in the first waveguide based on an electrical signal received at a second metal contact in the first metal contact section or the second metal contact section.

FIG. 14 is a flow diagram of another example of a process 1400 for fabricating an integrated circuit interposer. The process 1400 includes the following steps.

Step 1402: Form a first metal contact layer on a semiconductor wafer, in which the first metal contact layer includes a plurality metal contact sections. The metal contact sections include a first metal contact section that includes a plurality of metal contacts configured to electrically couple to a first circuit, and a second metal contact section that includes a plurality of metal contacts configured to electrically couple to a second circuit.

Step 1404: Form a first patterned layer on the semiconductor wafer, including individually patterning a plurality of metal path sections.

Step 1406: Form a second patterned layer on the semiconductor wafer, including individually patterning a plurality of waveguide sections. The second patterned layer includes: a first waveguide that crosses at least one boundary between individually photomask patterned waveguide sections, a first modulator coupled to the first waveguide at a first location along the first waveguide configured to modulate an optical wave in the first waveguide based on an electrical signal received at a first metal contact in the first metal contact section, and a second modulator coupled to the first waveguide at a second location along the first waveguide configured to modulate the optical wave in the first waveguide based on an electrical signal received at a second metal contact in the first metal contact section or the second metal contact section.

Figure 15:
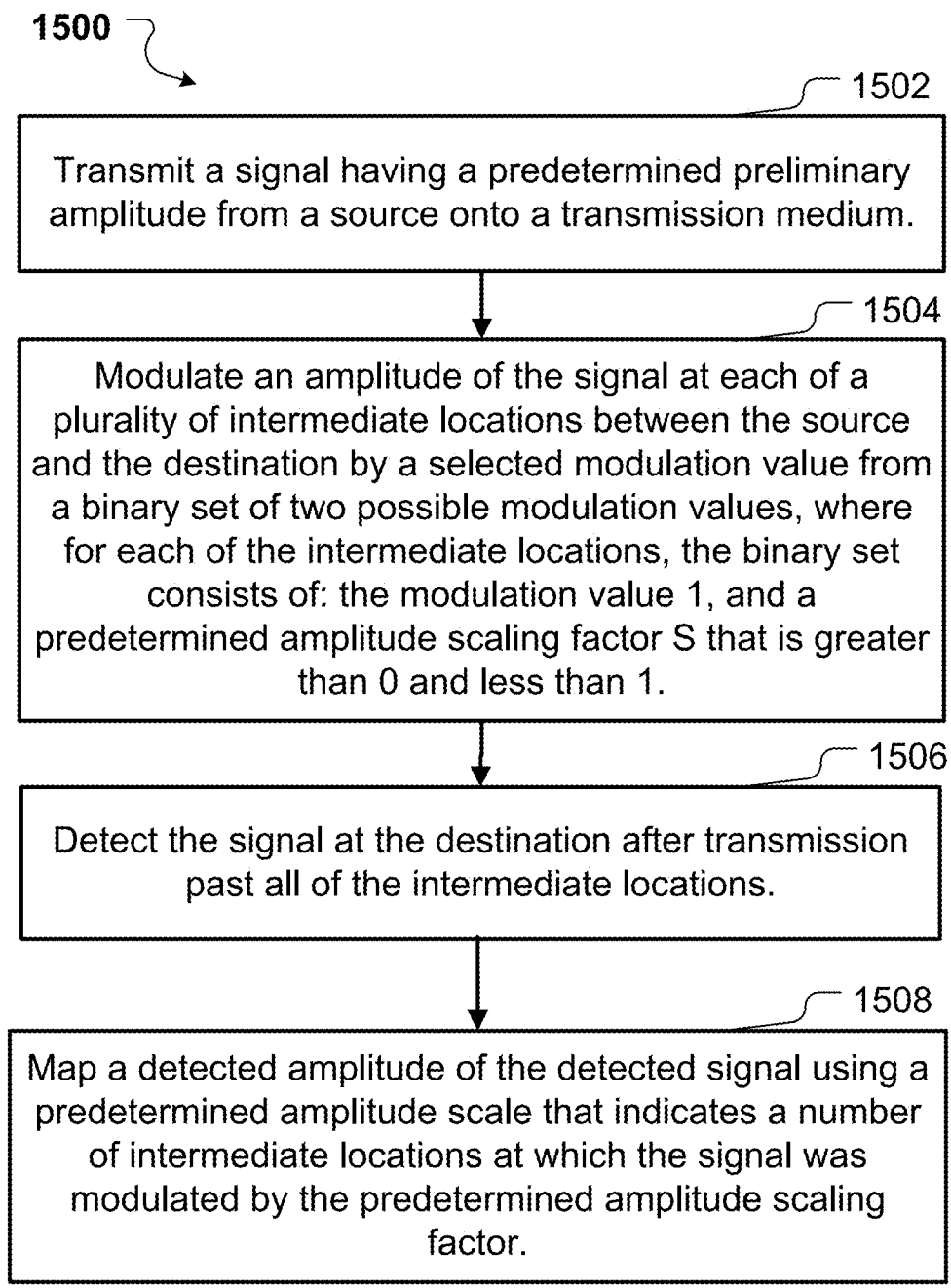

FIG. 15 is a flow diagram of an example of a process 1500 for transmitting information from a plurality of nodes to at least one destination. The process 1500 includes the following steps:

Step 1502: Transmit a signal having a predetermined preliminary amplitude from a source onto a transmission medium. The transmission medium can be similar to the transmission medium 408 (FIG. 4B), 514 (FIG. 5C), 606 (FIGS. 6, 8A), 514 (FIG. 5C), 1005 (FIG. 10), or 1108 (FIG. 11).

Step 1504: Modulate an amplitude of the signal at each of a plurality of intermediate locations between the source and the destination by a selected modulation value from a binary set of two possible modulation values, where for each of the intermediate locations, the binary set consists of: the modulation value 1, and a predetermined amplitude scaling factor S that is greater than 0 and less than 1.

Step 1506: Detect the signal at the destination after transmission past all of the intermediate locations. For example, the photodiodes 1104 (FIGS. 11A, 11B) can be used to detect the signal at the destination.

Step 1508: Map a detected amplitude of the detected signal using a predetermined amplitude scale that indicates a number of intermediate locations at which the signal was modulated by the predetermined amplitude scaling factor. For example, a digital logic circuit similar to the circuit 700 in FIG. 7 can be used to map the detected amplitude of the detected signal using the predetermined amplitude scale.

The process 1500 can include one or more of the following features. The predetermined amplitude scale can include a maximum detected amplitude that is substantially equal to the predetermined preliminary amplitude, and a minimum detected amplitude that is substantially equal to $S^N$ where N is the number of intermediate locations.

In some examples, the predetermined amplitude scaling factor S can be different for each intermediate location. In some examples, the predetermined amplitude scaling factor S can be equal for each intermediate location. The predetermined amplitude scaling factor S can be substantially equal to (k−1)/k, where k is the number of intermediate locations.

The signal transmitted from the source can have the predetermined preliminary amplitude within each of a plurality of time slots, including a first time slot. The modulation of the amplitude of the signal at each of the plurality of intermediate locations can occur within the first time slot after a propagation delay based on a propagation distance between each intermediate location and the source.

The process 1500 can include maintaining time synchronization among the plurality of nodes, the source, and the destination. The transmission medium can include an optical waveguide. The optical waveguide can be formed in an integrated circuit interposer that includes metal contacts arranged for electrically coupling to at least one semiconductor die in a controlled collapsed chip connection. The selected modulation value at one or more of the intermediate locations can be provided based on an electrical signal from the semiconductor die.

Figure 16:
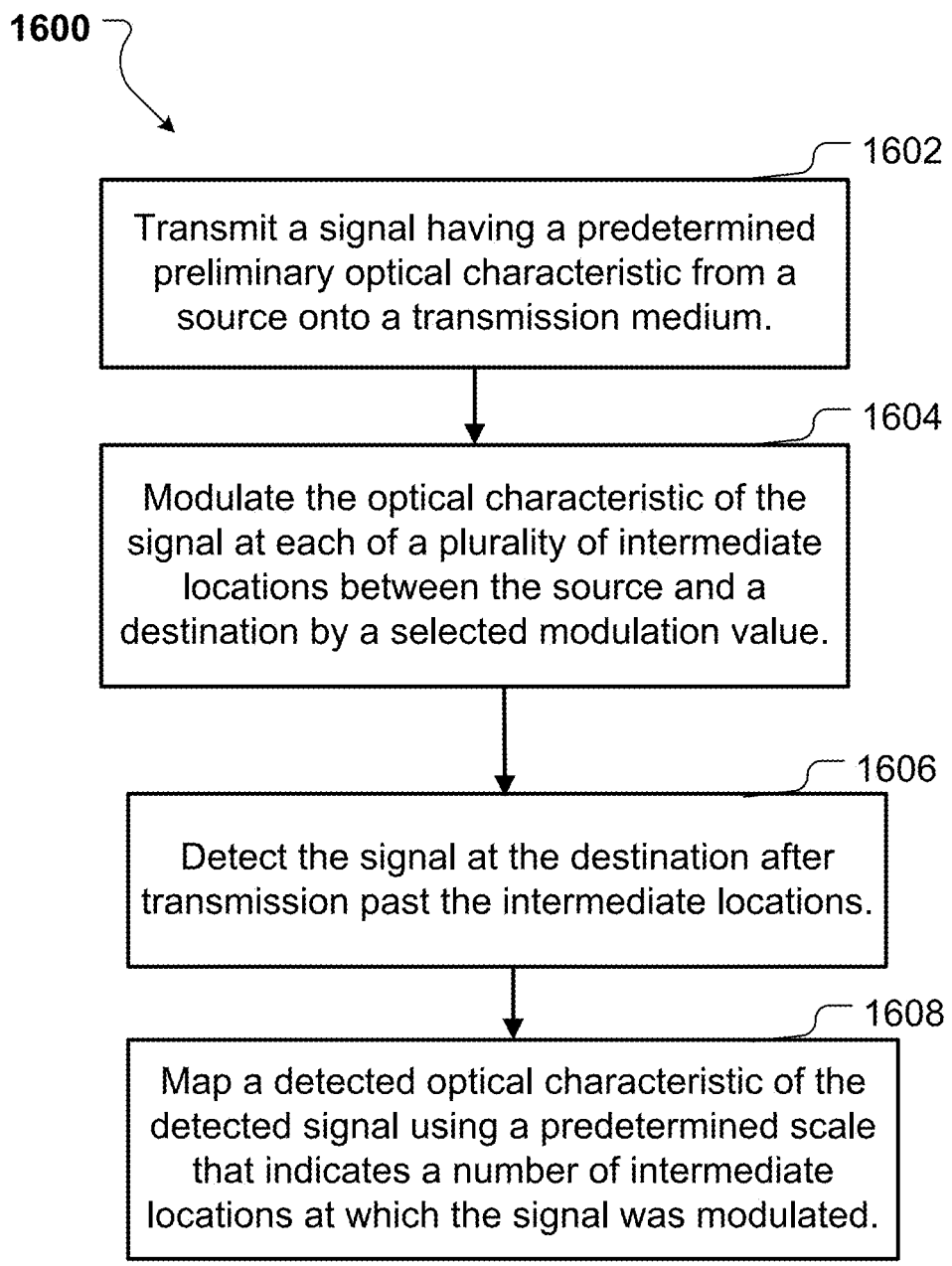

FIG. 16 is a flow diagram of an example of a process 1600 for transmitting information from a plurality of locations to at least one destination. The process 1600 includes the following steps:

Step 1602: Transmit a signal having a predetermined preliminary optical characteristic from a source onto a transmission medium.

Step 1604: Modulate the optical characteristic of the signal at each of a plurality of intermediate locations between the source and a destination by a selected modulation value.

Step 1606: Detect the signal at the destination after transmission past the intermediate locations.

Step 1608: Map a detected optical characteristic of the detected signal using a predetermined scale that indicates a number of intermediate locations at which the signal was modulated.

The process 1600 can include one or more of the following features. The optical characteristic can include amplitude. Modulating the optical characteristic can include modulating the amplitude of the signal at each of the plurality of intermediate locations by a modulation value selected from a binary set of two possible modulation values, where for each of the intermediate locations, the binary set consists of: a modulation value 1, and a predetermined amplitude scaling factor S that is greater than 0 and less than 1.

Mapping a detected optical characteristic of the detected signal can include mapping a detected amplitude of the detected signal using a predetermined amplitude scale that indicates a number of intermediate locations at which the signal was modulated by the predetermined amplitude scaling factor. The predetermined amplitude scale can include a maximum detected amplitude that is substantially equal to the predetermined preliminary amplitude, and a minimum detected amplitude that is substantially equal to $S^N$ in which N is the number of intermediate locations.

In some examples, the predetermined amplitude scaling factor S can be different for each intermediate location. In some examples, the predetermined amplitude scaling factor S can be equal for each intermediate location. The predetermined amplitude scaling factor S can be substantially equal to (k−1)/k, and k is the number of intermediate locations.

The signal transmitted from the source can have the predetermined preliminary amplitude within each of a plurality of time slots, including a first time slot. The modulation of the amplitude of the signal at each of the plurality of intermediate locations can occur within the first time slot after a propagation delay based on a propagation distance between each intermediate location and the source.

The process 1600 can include maintaining time synchronization among the plurality of nodes, the source, and the destination. The transmission medium can include an optical waveguide. The optical waveguide can be formed in an integrated circuit interposer that includes metal contacts arranged for electrically coupling to at least one semiconductor die in a controlled collapsed chip connection.

The selected modulation value at one or more of the intermediate locations can be provided based on an electrical signal from the semiconductor die. Modulating the optical characteristic can include modulating the amplitude of the signal at each of the plurality of intermediate locations by a modulation value selected from a binary set of two possible modulation values, where for each of the intermediate locations, the binary set consists of: a modulation value 1, and a predetermined amplitude scaling factor S that is greater than 1. For example, an optical amplifier (e.g., a semiconductor optical amplifier or a doped fiber amplifier) that provides optical gain can be used to achieve an amplitude scaling factor S>1.

The optical characteristic can include phase or polarization.

Figure 17:
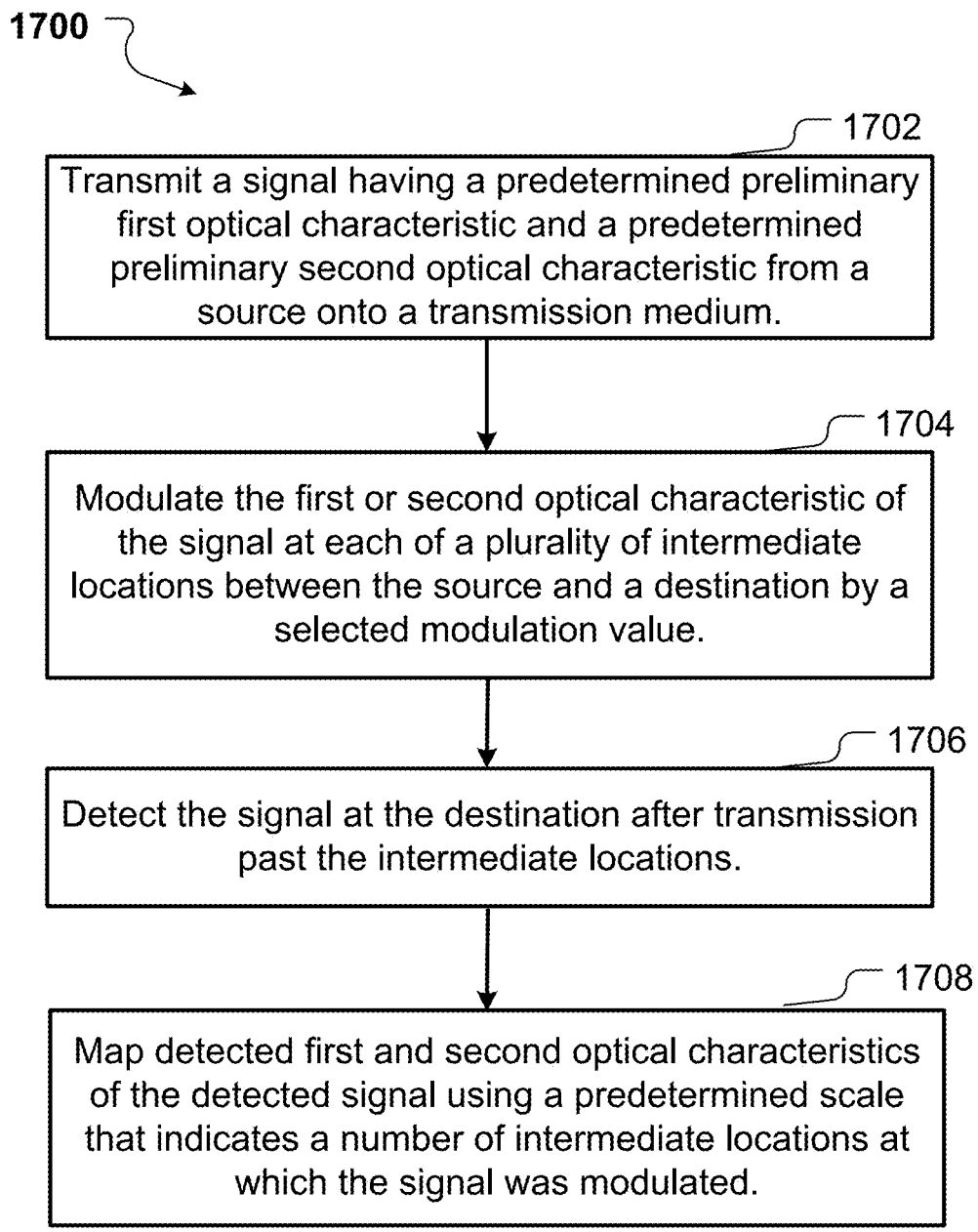

FIG. 17 is a flow diagram of an example of a process 1700 for transmitting information from a plurality of locations to at least one destination. The process 1700 includes the following steps:

Step 1702: Transmit a signal having a predetermined preliminary first optical characteristic and a predetermined preliminary second optical characteristic from a source onto a transmission medium.

Step 1704: Modulate the first or second optical characteristic of the signal at each of a plurality of intermediate locations between the source and a destination by a selected modulation value.

Step 1706: Detect the signal at the destination after transmission past the intermediate locations.

Step 1708: Map detected first and second optical characteristics of the detected signal using a predetermined scale that indicates a number of intermediate locations at which the signal was modulated.

The process 1700 can include one or more of the following features. In some examples, the first optical characteristic can include amplitude and the second optical characteristic can include phase. In some examples, the first optical characteristic can include amplitude and the second optical characteristic can include polarization. In some examples, the first optical characteristic can include phase and the second optical characteristic can include polarization.

The signal can have a predetermined preliminary third optical characteristic, the process 1600 can include modulating the first, second, or third optical characteristic of the signal at each of a plurality of intermediate locations between the source and a destination by a selected modulation value; and mapping detected first, second, and third optical characteristics of the detected signal using a predetermined scale that indicates a number of intermediate locations at which the signal was modulated. The first optical characteristic can include amplitude, the second optical characteristic can include phase, and the third optical characteristic can include polarization.

The systems and operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Some of the systems described in this specification can provide an optoelectronic platform and/or distributed PAM aggregation functionality for systems disclosed in U.S. patent application Ser. No. 16/431,167, filed on Jun. 4, 2019, published as US 20190370652, and U.S. patent application Ser. No. 17/204,320, filed on Mar. 17, 2021, published as US20210201126. The entire contents of the above patent applications and published application are incorporated herein by reference. For example, each of one or more of the compute units 108 of FIG. 1 can include the artificial neural network computation system 100 of FIG. 1A, the system 104 of FIG. 1F, the system 300 of FIG. 3A, the system 302 of FIG. 3B, the system 400 of FIG. 4A, the system 500 of FIG. 5, the system 700 of FIG. 7, the system 900 of FIG. 9, the optoelectronic computing system 1800 of FIG. 18, the system 1900 of FIG. 19A, the system 1920 of FIG. 19B, the system 2110 of FIG. 21B, the system 2300A of FIG. 23A, the system 2300B of FIG. 23B, the system 2300C of FIG. 23C, the system 2400A of FIG. 24A, the system 2400B of FIG. 24B, the system 2400C of FIG. 24C, the system 2400D of FIG. 24D, the system 2400E of FIG. 24E, the system 2600 of FIG. 26, the system 2700 of FIG. 27, the system 2800 of FIG. 28, the system 2900 of FIG. 29, the system 3000 of FIG. 30, the system 3100 of FIG. 31, the system 3200 of FIG. 32A, the system 3500 of FIG. 35A, the system 3600 of FIG. 36, the system 3700 of FIG. 37, the system 3800 of FIG. 38, or the system 4000 of FIG. 41, or some of the components of the systems mentioned above, of US20210201126. Each of one or more of the computing nodes 102 can include optoelectronic components in addition to electronic circuitry. Each of one or more of the computing nodes 102 can be coupled to the optoelectronic interposer integrated circuit 104 in a manner similar to how the integrated circuit 4604 is coupled to the integrated circuit 4602 as shown in FIG. 46, or in a manner similar to how the integrated circuit 4702 is coupled to the integrated circuit 4602 as shown in FIG. 47, of US20210201126, Each of one or more of the computing nodes 102 can include two or more integrated circuits stacked together as shown in FIGS. 48 and 49 of US20210201126.

In some implementations, the optoelectronic interposer integrated circuit 104 can be similar to the interposer 208 of FIGS. 2A, 2B, 2C, 2D, 2F, 2G, 3, 5C, 11A, 11B, the interposer 702 of FIG. 7, the integrated circuit 802 that serves as interposer as shown in FIGS. 8A, 8B, the integrated circuit 902 that serves as interposer as shown in FIGS. 9A, 9B, 9C, of U.S. provisional patent application 63/123,338, filed on Dec. 9, 2020, the entire content of which is herein incorporated by reference.

Various types of components can be mounted on the nic interposer integrated circuit 104, such as the laser 212, the thermoelectric cooler 216, the lens 220, the photonic circuit 224, the digital chip 232, or the digital storage module 234 (e.g., a stack of multiple dynamic random access memory (DRAM) chips, as in a high bandwidth memory (HBM) chip), as shown in FIG. 2A of U.S. 63/123,338.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An integrated circuit interposer, comprising:
   a semiconductor substrate layer;
   a first metal contact layer, at a first surface of the integrated circuit interposer, including a plurality metal contact sections, the metal contact sections including
      a first metal contact section that includes a plurality of metal contacts arranged for electrically coupling to a first semiconductor die in a controlled collapsed chip connection, and
      a second metal contact section that includes a plurality of metal contacts arranged for electrically coupling to a second semiconductor die in a controlled collapsed chip connection;
   a first patterned layer, at a first distance from the semiconductor substrate layer, including a plurality of individually photomask patterned metal path sections; and
   a second patterned layer, at a second distance from the semiconductor substrate layer different from the first distance, including a plurality of individually photomask patterned waveguide sections, the second patterned layer including
   a first waveguide that crosses at least one boundary between individually photomask patterned waveguide sections,
   a first modulator coupled to the first waveguide at a first location along the first waveguide for modulating an optical wave in the first waveguide based on an electrical signal received at a first metal contact in the first metal contact section, and
   a second modulator coupled to the first waveguide at a second location along the first waveguide for modulating the optical wave in the first waveguide based on an electrical signal received at a second metal contact;
wherein the plurality of individually photomask patterned waveguide sections comprise a first individually photomask patterned waveguide section and a second individually photomask patterned waveguide section, the second individually photomask patterned waveguide section is different from the first individually photomask patterned waveguide section,
wherein the first waveguide crosses at least one boundary between the first individually photomask patterned waveguide section and the second individually photomask patterned waveguide section.

2. The integrated circuit interposer of claim 1, wherein the waveguide sections include
   a first waveguide section that includes a first portion of the first waveguide that couples a guided mode to an edge of the first waveguide section, and
   a second waveguide section that includes a second portion of the first waveguide that couples a guided mode to an edge of the second waveguide section.

3. The integrated circuit interposer of claim 1, wherein the metal path sections include a first metal path section that overlaps with at least a portion of the first metal contact section and at least a portion of the second metal contact section, and provides at least one metal path between at least one metal contact of the first metal contact section and at least one metal contact of the second metal contact section.

4. The integrated circuit interposer of claim 3, wherein the metal path sections include a second metal path section that overlaps with at least a portion of the first metal contact section and does not overlap with any portion of the second metal contact section, and provides at least one metal path connected to at least one metal contact of the first metal contact section.

5. The integrated circuit interposer of claim 1, further comprising a second metal contact layer, at a second surface of the integrated circuit interposer, including a plurality metal contact sections.

6. The integrated circuit interposer of claim 1, further comprising at least one capacitor or inductor that is electrically coupled to the first semiconductor die.

7. The integrated circuit interposer of claim 1, wherein the first modulator and the second modulator are amplitude modulators configured to modulate the optical wave in the first waveguide by the same predetermined amplitude scaling factor.

8. A system comprising:
an integrated circuit interposer comprising:
   a first substrate comprising a plurality of sets of metal contacts on a surface of the first substrate, the plurality of sets of metal contacts comprising a first set of metal contacts and a second set of metal contacts; and
   one or more patterned waveguide layers that form one or more optical waveguides;
a plurality of semiconductor dies electrically coupled to the plurality of sets of metal contacts on the first substrate, each semiconductor die comprising a semiconductor substrate and circuitry formed on the semiconductor substrate;
wherein the plurality of semiconductor dies comprise a first semiconductor die and a second semiconductor die, the first semiconductor die comprises first circuitry, the second semiconductor die comprises second circuitry, the first semiconductor die is electrically coupled to the first set of metal contacts, the second semiconductor die is electrically coupled to the second set of metal contacts;
wherein the first circuitry is configured to communicate optically with the second circuitry through the one or more optical waveguides.

9. The system of claim 8 in which the integrated circuit interposer comprises a plurality of modulators and a plurality of photodetectors associated with the plurality of semiconductor dies, the plurality of modulators comprise a first modulator, the plurality of photodetectors comprise a first photodetector,
   wherein the first modulator of the integrated circuit interposer is electrically coupled to one or more metal contacts in the first set of metal contacts and configured to receive a first transmit electric signal from the first circuitry of the first semiconductor die and modulate light traveling in a first optical waveguide of the integrated circuit interposer based on the first transmit electric signal, and
   wherein the first photodetector of the integrated circuit interposer is electrically coupled to one or more metal contacts in the second set of metal contacts and configured to convert modulated light traveling in the first optical waveguide of the integrated circuit interposer to a first receive electric signal, and send the first receive electric signal to the second circuitry of the second semiconductor die through one or more of the metal contacts in the second set of metal contacts.

10. The system of claim 9 in which the plurality of modulators comprise a second modulator, the plurality of photodetectors comprise a second photodetector,
   wherein the second modulator of the integrated circuit interposer is electrically coupled to one or more metal contacts in the second set of metal contacts and configured to receive a second transmit electric signal from the second circuitry of the second semiconductor die and modulate light traveling in the first optical waveguide or a second optical waveguide of the integrated circuit interposer based on the second transmit electric signal, and
   wherein the second photodetector of the integrated circuit interposer is electrically coupled to one or more metal contacts in the first set of metal contacts and configured to convert modulated light traveling in the first or second optical waveguide of the integrated circuit interposer to a second receive electric signal, and send the second receive electric signal to the first circuitry of the first semiconductor die through one or more of the metal contacts in the first set of metal contacts.

11. The system of claim 8, comprising a laser die disposed on or in the first substrate and configured to provide a laser beam directed to the one or more optical waveguides.

12. An apparatus comprising:
an interconnection module comprising:
a first substrate;
a first metal contact layer formed on the first substrate, in which the first metal contact layer comprises a first metal contact configured to be electrically coupled to a first die comprising circuitry;
a patterned waveguide layer that comprises a plurality of individually photomask patterned waveguide sections disposed on the substrate, in which the patterned waveguide layer comprises a first waveguide that crosses at least one boundary between individually photomask patterned waveguide sections;
a first modulator coupled to the first waveguide at a first location along the first waveguide and configured to modulate an optical signal traveling in the first waveguide based on a first electrical signal received at the first metal contact from the first die; and
a second modulator coupled to the first waveguide at a second location along the first waveguide and configured to modulate the optical signal in the first waveguide based on a second electrical signal received at a second metal contact;
wherein the first waveguide enables the optical signal to travel from a source location to a target location across the at least one boundary between individually photomask patterned waveguide sections and be modulated by the first and second modulators as the optical signal travels from the source location to the target location.

13. The apparatus of claim 12 in which the first metal contact layer comprises a second metal contact that is configured to be electrically coupled to a second die comprising circuitry.

14. The apparatus of claim 13 in which the first metal contact is electrically coupled to the first die in a controlled collapsed chip connection, and the second metal contact is electrically coupled to the second die in a controlled collapsed chip connection.

15. The apparatus of claim 12 in which the first metal contact is located at a first region that corresponds to a first individually photomask patterned waveguide section; and the second metal contact is located at a second region that corresponds to a second individually photomask patterned waveguide section different from the first individually photomask patterned waveguide section.

16. The apparatus of claim 12, comprising:
a detector configured to detect the optical signal after transmission past the first and second modulators to generate a detected signal; and
circuitry configured to map a detected amplitude of the detected signal using a predetermined amplitude scale that indicates a number of modulators by which the signal was modulated.

17. The apparatus of claim 12, comprising:
a detector configured to detect the optical signal after transmission past the first and second modulators to generate a detected signal; and
circuitry configured to map a detected phase of the detected signal using a predetermined phase scale that indicates a number of modulators by which the signal was modulated.

18. The apparatus of claim 12, comprising:
a detector configured to detect the optical signal after transmission past the first and second modulators to generate a detected signal; and
circuitry configured to map a detected polarization of the detected signal using a predetermined polarization scale that indicates a number of modulators by which the signal was modulated.

19. The apparatus of claim 12 in which each individually photomask patterned waveguide section is fabricated by exposure of a corresponding photomask using a lithography system, different individually photomask patterned waveguide sections are fabricated by different exposures of a same photomask or different photomasks.

20. The apparatus of claim 12 in which the first metal contact is electrically coupled to the first die in a controlled collapsed chip connection.

21. The apparatus of claim 12, comprising the first die.

22. The apparatus of claim 13, comprising the first and second dies.

23. The apparatus of claim 12 in which the first modulator is configured to modulate an amplitude of the optical signal.

24. The apparatus of claim 12 in which the first modulator is configured to modulate a phase or polarization of the optical signal.

25. The apparatus of claim 12 in which the patterned waveguide layer comprises:
a first individually photomask patterned waveguide section that comprises a first portion of the first waveguide that couples a guided mode to an edge of the first waveguide section, and
a second individually photomask patterned waveguide section that includes a second portion of the first waveguide that couples a guided mode to an edge of the second waveguide section.

26. The apparatus of claim 12, comprising a second metal contact layer that comprises a second metal contact, in which the first metal contact is disposed at a first side of the substrate, and the second metal contact is disposed at a second side of the substrate.

27. The apparatus of claim 12 in which the interconnection module comprises an optoelectronic interposer,
wherein the substrate, the first metal contact layer, the patterned waveguide layer, the first modulator, and the second modulator are parts of the optoelectronic interposer.

28. The apparatus of claim 12 in which the first substrate comprise a semiconductor substrate.

29. The apparatus of claim 12 in which the interconnection module comprises a filter capacitor or a decoupling capacitor that is electrically coupled to the first die.

30. An apparatus comprising:
an interposer comprising:
an interposer substrate;
a first metal contact layer formed on the interposer substrate, in which the first metal contact layer comprises a first metal contact, a second metal contact, and a third metal contact, the first metal contact is configured to be electrically coupled to a first die comprising circuitry, the second metal contact is configured to be electrically coupled to the first die, the first die comprising a first substrate different from the interposer substrate;
a patterned waveguide layer formed on the interposer substrate, in which the patterned waveguide layer comprises a first waveguide;
a first modulator coupled to the first waveguide at a first location along the first waveguide and configured to modulate an optical signal traveling in the first waveguide based on a first electrical signal received at the first metal contact to generate a first modulated optical signal;

a second modulator coupled to the first waveguide at a second location along the first waveguide and configured to modulate the first modulated optical wave in the first waveguide based on a second electrical signal received at the second metal contact to generate a second modulated optical signal;

a detector configured to detect the second modulated optical signal to generate a detected signal; and detection circuitry configured to map a detected characteristic of the detected signal to an output signal using a predetermined scale that indicates a number of modulators by which the signal was modulated in a predetermined manner, in which the output signal is electrically coupled to the third contact.

31. The apparatus of claim 30 in which the first metal contact is electrically coupled to the first die in a controlled collapsed chip connection.

32. The apparatus of claim 31 in which the second metal contact is electrically coupled to the second die in a controlled collapsed chip connection.

33. The apparatus of claim 32 in which the third metal contact is electrically coupled to the third die in a controlled collapsed chip connection.

34. The apparatus of claim 30 in which the first metal contact layer comprises a first metal contact section and a second metal contact section, the first metal contact section comprising a plurality of metal contacts arranged for electrically coupling to the first die, and the second metal contact section comprising a plurality of metal contacts arranged for electrically coupling to the second die.

35. The apparatus of claim 34 in which the plurality of metal contacts in the first metal contact section are electrically coupled to the first die in a controlled collapsed chip connection.

36. The apparatus of claim 35 in which the plurality of metal contacts in the second metal contact section are electrically coupled to the second die in a controlled collapsed chip connection.

37. The apparatus of claim 34, comprising a first patterned metal layer formed on the interposer substrate, the first patterned metal layer comprising a plurality of individually photomask patterned metal path sections.

38. The apparatus of claim 37, in which the patterned waveguide layer comprises a plurality of individually photomask patterned waveguide sections, and the first waveguide crosses at least one boundary between individually photomask patterned waveguide sections.

39. The apparatus of claim 37 in which the first metal contact is located at a first region that corresponds to a first individually photomask patterned waveguide section; and the second metal contact is located at a second region that corresponds to a second individually photomask patterned waveguide section different from the first individually photomask patterned waveguide section.

40. An apparatus comprising:
an interposer configured to perform a distributed pulse-amplitude modulation on an optical signal in a first optical waveguide based on a first electrical signal and a second electrical signal, in which the first electrical signal is received from a first die electrically coupled to the interposer, and the second electrical signal is received from the first die.

41. The apparatus of claim 40 in which the interposer comprises an interposer substrate, the first die comprises a first substrate different from the interposer substrate.

42. The apparatus of claim 41 in which the second die comprises a second substrate different from the interposer substrate.

43. The apparatus of claim 41 in which the first die is electrically coupled to the interposer using a controlled collapsed chip connection.

44. The apparatus of claim 42 in which the second die is electrically coupled to the interposer using a controlled collapsed chip connection.

45. The apparatus of claim 40 in which the interposer comprises:
an interposer substrate; and
a first metal contact layer formed on the interposer substrate, in which the first metal contact layer comprises a first metal contact, a second metal contact, and a third metal contact, the first metal contact is configured to be electrically coupled to the first die, and the second metal contact is configured to be electrically coupled to the first die.

46. The apparatus of claim 45 in which the interposer comprises the first optical waveguide, a first modulator, and a second modulator,
the first modulator is configured to modulate the optical signal in the first optical waveguide based on the first electrical signal received at the first metal contact, and
the second modulator is configured to modulate the optical signal in the first optical waveguide based on the second electrical signal received at the second metal contact.

47. The apparatus of claim 46, comprising a detector configured to detect the optical signal after transmission past the first and second modulators to generate a detected signal; and
detection circuitry configured to map a detected amplitude of the detected signal to an output signal using a predetermined amplitude scale that indicates a number of modulators by which the signal was modulated.

48. The apparatus of claim 47 in which the output signal is electrically coupled to a third contact that is electrically coupled to at least one of the first die or a third die.

49. The integrated circuit interposer of claim 1 in which the second metal contact is in the first metal contact section.

50. The integrated circuit interposer of claim 1 in which the second metal contact is in the second metal contact section.

51. The integrated circuit interposer of claim 1, further comprising at least one capacitor or inductor that is electrically coupled to the second semiconductor die.

52. The apparatus of claim 12 in which the second metal contact is electrically coupled to the first die.

53. The apparatus of claim 12 in which the second metal contact is electrically coupled to a second die comprising circuitry.

54. The apparatus of claim 12 in which the interconnection module comprises a filter capacitor or a decoupling capacitor that is electrically coupled to the second die.

55. An apparatus comprising:
an interposer comprising:
an interposer substrate;
a first metal contact layer formed on the interposer substrate, in which the first metal contact layer comprises a first metal contact, a second metal contact, and a third metal contact, the first metal contact is configured to be electrically coupled to a first die comprising circuitry, the second metal contact is configured to be electrically coupled to a second die comprising circuitry, the first die comprising a first substrate different from the interposer substrate, the second die comprising a second substrate different from the interposer substrate;

a patterned waveguide layer formed on the interposer substrate, in which the patterned waveguide layer comprises a first waveguide;

a first modulator coupled to the first waveguide at a first location along the first waveguide and configured to modulate an optical signal traveling in the first waveguide based on a first electrical signal received at the first metal contact to generate a first modulated optical signal;

a second modulator coupled to the first waveguide at a second location along the first waveguide and configured to modulate the first modulated optical wave in the first waveguide based on a second electrical signal received at the second metal contact to generate a second modulated optical signal;

a detector configured to detect the second modulated optical signal to generate a detected signal; and detection circuitry configured to map a detected characteristic of the detected signal to an output signal using a predetermined scale that indicates a number of modulators by which the signal was modulated in a predetermined manner, in which the output signal is electrically coupled to the third contact.

56. The apparatus of claim 55 in which the third contact is electrically coupled to at least one of the first die, the second die, or the third die.

57. The apparatus of claim 30 in which the third contact is electrically coupled to at least one of the first die, the second die, or the third die.

58. An apparatus comprising:

an interposer configured to perform a distributed pulse-amplitude modulation on an optical signal in a first optical waveguide based on a first electrical signal and a second electrical signal, in which the first electrical signal is received from a first die electrically coupled to the interposer, and the second electrical signal is received from a second die electrically coupled to the interposer.

59. The apparatus of claim 58 in which the interposer comprises:

an interposer substrate; and a first metal contact layer formed on the interposer substrate, in which the first metal contact layer comprises a first metal contact, a second metal contact, and a third metal contact, the first metal contact is configured to be electrically coupled to the first die, the second metal contact is configured to be electrically coupled to the second die.

60. The apparatus of claim 59 in which the interposer comprises the first optical waveguide, a first modulator, and a second modulator, the first modulator is configured to modulate the optical signal in the first optical waveguide based on the first electrical signal received at the first metal contact, the second modulator is configured to modulate the optical signal in the first optical waveguide based on the second electrical signal received at the second metal contact, wherein the apparatus comprises a detector configured to detect the optical signal after transmission past the first and second modulators to generate a detected signal, wherein the apparatus comprises detection circuitry configured to map a detected amplitude of the detected signal to an output signal using a predetermined amplitude scale that indicates a number of modulators by which the signal was modulated, wherein the output signal is electrically coupled to a third contact that is electrically coupled to at least one of the second die or a third die.

61. The apparatus of claim 1 in which the first individually photomask patterned waveguide section is fabricated by a first exposure of a first photomask using a lithography system, the second individually photomask patterned waveguide section is fabricated by a second exposure of the first photomask or a second photomask using the lithography system, and the first exposure is different from the second exposure.

* * * * *

UNITED STATES PATENT AND TRADEMARK OFFICE
CERTIFICATE OF CORRECTION

PATENT NO. : 11,686,955 B2  
APPLICATION NO. : 17/367963  
DATED : June 27, 2023  
INVENTOR(S) : Huaiyu Meng et al.

Page 1 of 1

It is certified that error appears in the above-identified patent and that said Letters Patent is hereby corrected as shown below:

In the Claims

<u>Column 32</u>  
Line 53, in Claim 1, after "plurality" insert -- of --

<u>Column 40</u>  
Line 34, in Claim 61, delete "apparatus" and insert -- integrated circuit interposer --

Signed and Sealed this  
Sixteenth Day of July, 2024

Katherine Kelly Vidal  
*Director of the United States Patent and Trademark Office*